(12) United States Patent
Kim

(10) Patent No.: US 11,496,605 B1
(45) Date of Patent: Nov. 8, 2022

(54) MANAGEMENT OF NETWORK RESOURCE TRANSFERS VIA NETWORK PORTALS AND PHYSICAL PORTALS

(71) Applicant: CICINDELAE, INC, Cerritos, CA (US)

(72) Inventor: Do Gi Kim, Los Alamitos, CA (US)

(73) Assignee: CICINDELAE, INC, Cerritos, CA (US)

( * ) Notice: Subject to any disclaimer, the term of this patent is extended or adjusted under 35 U.S.C. 154(b) by 0 days.

(21) Appl. No.: 17/661,247

(22) Filed: Apr. 28, 2022

Related U.S. Application Data

(60) Provisional application No. 63/201,449, filed on Apr. 29, 2021.

(51) Int. Cl.
*H04L 67/62* (2022.01)
*H04L 67/75* (2022.01)
*H04L 67/52* (2022.01)

(52) U.S. Cl.
CPC .............. *H04L 67/62* (2022.05); *H04L 67/52* (2022.05); *H04L 67/75* (2022.05)

(58) Field of Classification Search
CPC ......... H04L 2012/5631; H04L 67/1078; H04L 67/62; H04L 67/52; H04L 67/75; H04L 63/10
See application file for complete search history.

(56) References Cited

U.S. PATENT DOCUMENTS

| 7,689,468 B2* | 3/2010 | Walker ............... G06Q 30/0611 705/26.4 |
| 2017/0330159 A1* | 11/2017 | Castinado .............. G06Q 20/02 |
| 2021/0201341 A1* | 7/2021 | Wedderburn ...... G06Q 30/0214 |

* cited by examiner

*Primary Examiner* — Glenton B Burgess
*Assistant Examiner* — Rachel J Hackenberg
(74) *Attorney, Agent, or Firm* — Knobbe Martens Olson & Bear, LLP

(57) ABSTRACT

The present disclosure generally relates to database modification, and in particular, database modification in the context of networked platforms accessible by user computing devices. One example context to which such database modification techniques can be applied is a network provider providing a plurality of individual network portals via which users may acquire network resources and perform other transactions. Acquired network resources can subsequently be transferred to other users within or outside the communication network, and the original owner of the network resources may specify resource transfer options that specify the rules that govern these subsequent transfers. Further, these transactions may occur via network portals and/or physical portals associated with the users of the communication network. The network provider may maintain a database that keeps track of the network resources and update the database as these transactions occur.

20 Claims, 10 Drawing Sheets

… (1)

MANAGEMENT OF NETWORK RESOURCE TRANSFERS VIA NETWORK PORTALS AND PHYSICAL PORTALS

CROSS-REFERENCE TO RELATED APPLICATIONS

This application claims priority to U.S. Provisional Patent Application No. 63/201,449, filed on Apr. 29, 2021, the entire contents of which are incorporated by reference herein in their entirety and for all purposes.

BACKGROUND

Technical Field

The present disclosure generally relates to database modification, and in particular, database modification in the context of networked platforms accessible by user computing devices.

Description of Related Technology

Various computing platforms allow users to access certain network resources via network portals or web pages and perform various transactions such as upload and download content, request access to network resources, purchase items, send and receive messages, etc. Such platforms may keep track of the various content, network resources, items, messages, etc. using database entries, and perform updates to the database entries in response to transactions that alter the statuses of such of the various content, network resources, items, messages, etc.

SUMMARY

The present disclosure generally relates to database modification, and in particular, database modification in the context of networked platforms accessible by user computing devices. One example context to which such database modification techniques can be applied is a network provider providing a plurality of individual network portals via which users may acquire network resources and perform other transactions. Acquired network resources can subsequently be transferred to other users within or outside the communication network, and the original owner of the network resources may specify resource transfer options that specify the rules that govern these subsequent transfers. Further, these transactions may occur via network portals and/or physical portals associated with the users of the communication network. The network provider may maintain a database that keeps track of the network resources and update the database as these transactions occur.

BRIEF DESCRIPTION OF THE DRAWINGS

The foregoing and other features, aspects and advantages of the present invention are described in detail below with reference to the drawings of various implementations, which are intended to illustrate and not to limit the invention. The drawings comprise the following figures in which.

DETAILED DESCRIPTION OF EMBODIMENTS

Figure 1:
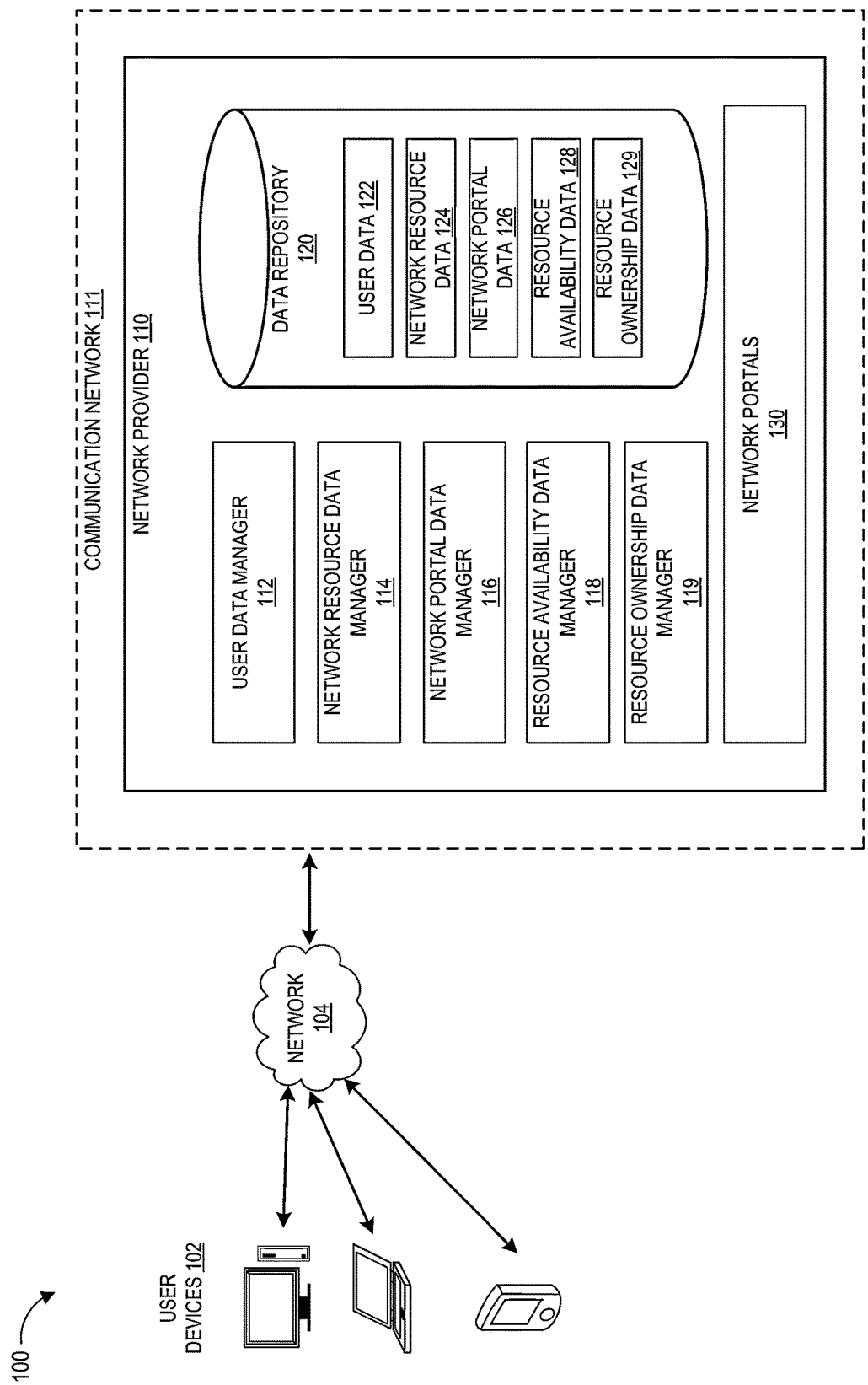
FIG. 1 illustrates a computing environment in accordance with aspects of the present disclosure.

Embodiments of the invention will now be described with reference to the accompanying figures. The terminology used in the description presented herein is not intended to be interpreted in any limited or restrictive manner, simply because it is being utilized in conjunction with a detailed description of certain specific implementations of the invention. Furthermore, embodiments of the invention may comprise several novel features, no single one of which is solely responsible for its desirable attributes or which is essential to practicing the inventions herein described.

INTRODUCTION

A network provider may provide a plurality of network portals via which access to certain network resources, which may be provided by one or more users of the network provider or by the network provider itself, may be requested and granted. For example, a user may connect, on his or her user computing device, to the network portal, view the available network resources, and request access to one or more of the available network resources.

A network portal, which may be associated with a plurality of internal users, may provide a listing of the available network resources, and a user visiting the network portal may select one of the available network resources to request access to the network resource. Once the request is processed/granted by the network provider (or the owner of the network resource), access to the selected network resource is provided to the requesting user.

In some cases, the same type of network resources accessible via the network provider may be derived from multiple sources. For example, one user of the network provider may have a first amount of a first network resource (e.g., 5 units of a particular computing resource, digital resources, or physical resource) available for access, lease, or temporary/permanent acquisition by other users of the network provider, and another user of the network provider may have a second amount of the same first network resource (e.g., 10 units of the same network resource). Additionally, these network resources may be accessed, leased, or temporarily or permanently acquired by other users of the network provider via the plurality of network portals provided by the network provider and/or a plurality of physical portals provided by the internal users of the network provider. Further, these network resources may also be transferred to various different entities such as to the original owner of the network resource, another internal user of the network provider, a user outside the communication network of the network provider, the network provider, and/or another virtual or physical location designated by one of those entities.

Thus, it may be cumbersome to keep track of all providers or owners of the network resources as well as the network portals via which such network resources can be accessed, leased, or acquired (or request to access, lease, or acquire may be received) by other users of the network provider, how the network resources are initially or subsequently transferred, any restrictions that may be placed on the transfers, etc.

The aforementioned challenges, among others, is addressed in some embodiments by the disclosed techniques for allowing the network provider to monitor the transfer of network resources to and from the various entities via its network portals and/or other physical portals provided by users of the network provider (e.g., ownership of the network resource, physical or virtual location of the network resource, restrictions and policies governing the transfers, etc.). By doing so, the network provider improves the network resource transferability, thereby improving the experience of its users in acquiring the network resources provided by the network provider and subsequently the network resources to another network entity or user.

The present disclosure describes techniques for facilitating the initial transfer of a network resource after its initial acquisition, facilitating subsequent re-transfers by using the network portals of the network provider, and providing a greater amount of flexibility for network resource owners regarding the transfer options, rules, and policies that govern the network resource transfer. As will be appreciated by one of skill in the art in light of the present disclosure, the embodiments disclosed herein improve the ability of computing systems, such as network resource provider systems and database systems, to provide mechanisms for simplifying the process of managing and improving network resource acquisition and transfer.

The presently disclosed embodiments therefore address technical problems inherent within computing systems, such as simplifying network resource management, acquisition, and transfer, optimizing database entry modification process, and improving network resource transferability. These technical problems are addressed by the various technical solutions described herein, including automatically rendering transferred network resources to be accessible via network portals, and allowing the network resource providers to specify the rules and policies for transferring the network resource. Thus, the present disclosure represents an improvement on existing network resource provisioning systems, and computing systems in general.

These and other aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrate only, and are not intended to be limiting.

Additional Considerations

In some cases, there is a latency between the time at which access to the network resource is requested and the time at which the request is granted. Also, there may be a latency between the time at which the request is granted and the time at which the requested network resource is actually provided to the requesting user.

In some embodiments, a network resource includes computing resources such as CPU, disk, storage, memory, network bandwidth, and/or virtual or physical machines that can be accessed by a user of a user computing device. Such computing resources may be provided by the network provider or by one or more computing systems external to the network provider. Once access to such computing resources is requested, the requested computing resources may be provisioned and assigned/leased to the requesting user. In other embodiments, a network resource includes digital resources such as digital books, database entries, electronic publications, or other types of electronic data. Once access to such digital resources is requested, the digital resources may be electronically delivered to the requesting user. In yet other embodiments, a network resource includes physical resources such as items, products, goods, etc. In such embodiments, once access to the physical resource is requested, the physical resource may be shipped, delivered, or assigned to the requesting user.

In some embodiments, the network resources described herein may each be of limited supply (e.g., only a limited number of requesting users may be able to access a particular resource) or unique (e.g., there may be only one of each network resource). In other embodiments, the network resources may include digitally consumable items that may be copied, accessed, or utilized an effectively unlimited number of times.

A network portal may be provided to each resource-providing user of the network provider. In some cases, a network portal may be provided to each resource-owning user of the network provider. In some cases, a non-resource-providing user of the network provider may be assigned a network portal as well. In some cases, a non-resource-owning user of the network provider may be assigned a network portal as well.

Overview

The present disclosure generally relates to database modification, and in particular, database modification in the context of networked platforms accessible by user computing devices. One example context in which such database modification techniques can be applied is a network provider providing a communication network (or simply, network) of individual network portals (also referred to herein as electronic stores or online stores) that are each managed by one of a plurality of retailers registered with the network provider. Such a network provider may allow retailers to share products with each other, on top of providing traditional dropshipping capabilities (i.e. allowing the retailers to sell manufacturer's items on the retailers' stores). When a product is uploaded by a retailer and shared with other retailers in the network (e.g., retailers registered with the network provider), the shared product becomes not only visible on the retailer's own network portal, but also becomes selectable by other retailers in the network. When selected, the shared product becomes visible (and purchasable) on those retailers' respective online stores along with the retailers' own products (e.g., uploaded by the owners of the online stores) and/or dropshipped products from outside suppliers (e.g., imported from other manufacturers or retailers).

Dropshipping

The network provider described herein allows a supplier's products to be selected and sold by individual retailers in the network on their respective network portals. When a sale is made on a retailer's network portal, the network provider receives a payment from the purchaser, sends a purchase order and shipping instructions to the supplier, and uses the received payment to pay the supplier (e.g., a wholesale price of the sold product) and the retailer (e.g., a commission for selling the product). Then, the supplier ships the product to the purchaser in a box that also includes information about the retailer (e.g., purchaser thinks she bought the product from the retailer). In some implementations, the supplier ships the product to the network provider or the retailer, and the network provider or the retailer then ships the product to the purchaser.

Product Sharing Among Retailers

The network provider, in addition to providing the dropshipping process described above, further allows retailers within the network to upload their own products onto the network and share them with other retailers within the network. When a shared product is selected by a retailer, the product becomes visible (and purchasable) on that retailer's network portal along with the retailer's own products and/or dropshipped products from suppliers. When the shared product is sold on the retailer's online store, the network provider receives a payment from the purchaser, sends shipping instructions to the original retailer who shared the product with the network, and uses the received payment to pay the selling retailer who sold the product (e.g., a commission for selling the product) and the original retailer who shared the product (e.g., a retail price of the sold product minus commissions/fees). Then, the original retailer ships the product to the purchaser in a box that also includes information about the selling retailer (e.g., purchaser thinks she bought the product from the selling retailer).

Retailers' Individual Network Portals

The network provider allows retailers to set up their own network portals within the communication network. For example, a retailer who has her own brick-and-mortar store (also referred to herein as an offline store or a physical store) may register with the network provider and create a network portal that can be loaded with the retailer's own products or other products shared by other retailers within the communication network. The network provider may provide various software tools usable by the retailer to create and modify its network portal. The network portal may be associated with a uniform resource locator (URL) that can be accessed by the customers of the retailer to visit the network portal and browse the purchasable products made available by the retailer.

Adding Items to Network Portals

Items such as clothing, shoes, accessories, and etc. can be added to these network portals. The items can be the store owner's own items (either purchased offline or purchased from a manufacturer or supplier via the network provider) or other retailers' items shared by such other retailers within the communication network provided by the network provider.

Retailer's Own Items

One way of populating a retailer's network portal is with the retailer's own items (e.g., items that the retailer acquired from outside the communication network). The store owner can upload her own items onto the network provider by providing the name, description, model number, picture(s), and quantity of each item that she wants to sell on the network portal, and the item can be displayed to the visitors of the retailer's network portal. The visitors can then purchase the item directly from the retailer's network portal. Alternatively, the retailer can purchase an item (usually in bulk quantities) from a manufacturer registered with the network provider and sell the purchased item on the retailer's network portal. The price at which the retailer purchases the item from the manufacturer is usually lower than the price at which the retailer's customers are willing to purchase the item at the retailer's network portal, so the retailer still makes a profit.

Shared Items Belonging to Other Retailers

Another way of populating a retailer's online store is with items that are shared by other retailers within the communication network provided by the network provider. Any retailer part of the communication network (e.g., registered with the network provider) can choose to share her own items with other retailers within the communication network, and a retailer can select, from the items shared by other retailers, items that she wishes to sell on her own network portal provided by the network provider. The selected items are displayed to the visitors of the retailer's network portal alongside the retailer's own items as if they were the retailer's own items (e.g., indistinguishable by the visitors whether an item displayed on the retailer's network portal is the store owner's own item or an item owned by another retailer in the communication network and shared with the store owner). When an item that belongs to one retailer is sold from the network portal of another retailer, some of the proceeds from the sale are shared with the owner of the item.

Computing Environment

FIG. 1 illustrates a computing environment 100 including user devices 102 and a communication network 111, which are in communication with each other via a network 104. The communication network 111 includes a network provider 110, which includes various components that facilitate and perform the techniques described herein. The users at the user devices 102 can access and interact with, via the network 104, various network resources provided by the network provider 110. Such network resources may include network portals (also referred to herein as electronic stores or online stores) and management tools usable to configure the network portals.

Network of Users and Network Portals Provided by Network Provider

The communication network 111 is a network of users and network portals provided by the network provider 110. The communication network 111 includes a group of users (e.g., retailers, manufacturers, and/or consumers) interconnected by the network provider 110 such that the users in the group can share items with each other and facilitate transactions on behalf of each other. For example, an item owned and uploaded by one retailer may be sold via another retailer's network portal along with the store owner's own item and/or another item provided by a manufacturer. This type of network facilitates sharing of items across multiple network portals and increases the overall visibility of the shared items.

Network Provider

In FIG. 1, the network provider 110 includes a user data manager 112, a network resource data manager 114 (also referred to herein as item data manager 114), a network portal data manager 116 (also referred to herein as store data manager 116), a resource availability data manager 118 (also referred to herein as inventory data manager 118), a resource ownership data manager 119 (also referred to herein as return data manager 119), data repository 120, and network portals 130 (also referred to herein as network stores 130). The data repository 120 includes user data 122, network resource data 124 (also referred to herein as item data 124), network portal data 126 (also referred to herein as store data 126), and resource availability data 128 (also referred to herein as inventory data 128), and resource ownership data 129 (also referred to herein as return data). The network provider 110 may be implemented by one or more computing devices that may communicate with data depository 120. The network provider 110 may also operate in a distributed computing environment including several computer systems that are interconnected using one or more computer networks. Moreover, the processing of the various components or modules of the network provider 110 can be distributed across multiple machines, networks, or other computing resources. The various components or modules of the network provider 110 can also be implemented in one or more virtual machines or hosted computing environment (e.g., "cloud") resources, rather than in dedicated servers.

User Data

The user data manager 112 creates, updates, and manages the user data 122. The user data 122 may include any data regarding the users accessing the communication network 111 via the user devices 102, which may include, for example, retailers, customers, and manufacturers. The retailers may be in the business of purchasing goods from manufacturers or wholesalers and selling the purchased goods to consumers. The customers may be consumers who visit the network portals provided by the network provider 110 and purchase the items made available on the network portals. The manufacturers may be in the business of manufacturing goods and selling the manufactured goods to the retailers or to the consumers via the retailers. In some implementations, the retailers and/or the manufacturers include brands, designers, distributers, or other types of sellers/vendors. For example, the user data 122 associated with a given user may include a user identifier, the user's email address, the user's network portal information, the user's profile information, and the like.

Item Data

The item data manager 114 creates, updates, and manages the item data 124. The item data 124 may include any data regarding the items available on the communication network 111, which may include, for example, any item or product associated with one or more users of the communication network 111 such as brands, retailers, designers, manufacturers, distributors, sellers, vendors, owners, etc. In implementations, the item can include any type of clothing, legwear, socks, sunglasses, hats, belts, shoes, jewelry, beauty products and fashion accessories, etc. In this disclosure, the term "item" is used interchangeably to refer to an item itself (e.g., a particular product, service, any of the items referred to above, or the like) and to its description or representation in a computer system. As will be apparent from the context in which it is used, the term is also sometimes used herein to refer only to the item itself or only to its representation in the computer system. For example, the item data 124 associated with a given item may include an item identifier, the item's owner, the item's manufacturer, an item model number, an item price, an item color, an item size, an item category, whether the item is shared with users other than its owner, and the like.

Store Data

The store data manager 116 creates, updates, and manages the store data 126.

The store data 126 may include any data regarding the network portals 130 within the communication network 111 (e.g., network portals belonging to the retailers within the communication network 111). For example, the store data 126 associated with a given network portal 130 may include a network portal identifier, the network portal's owner, the network portal's location or URL, the network portal's contact information, the network portal's configuration settings for displaying the items, the network portal's item filters for importing shared items from the communication network 111, and the like.

Inventory Data

The inventory data manager 118 creates, updates, and manages the inventory data 128. The inventory data 128 may include any data regarding the availability and available quantities of the items available on the communication network 111. For example, the inventory data 128 associated with a given item may include an item identifier, the item's owner, quantity available for sale (e.g., not yet sold), quantity in the warehouse (e.g., not yet shipped), location(s) of the item, and the like.

Return Data

The inventory data manager 119 creates, updates, and manages the return data 129. The return data 129 may include any data relating to a return of an item that was purchased via the communication network 111. For example, the return data 129 may include return status information (e.g., a binary flag indicating whether an item has been returned), return price information (e.g., a discounted selling price of an item subsequent to being returned), return location information (e.g., whether an item is returned to the original seller from whom the item was purchased, to a warehouse of the network provider, or a seller different from the original seller), return mode information (e.g., whether an item is returned via online and shipped to the return location, or returned to an offline store and physically dropped off at the return location), return policy information (e.g., whether a seller receiving the returned item is allowed to re-sell the item), hold time information (e.g., a time limit after which the returned item is to be sent to the owner of the item or the warehouse of the network provider 110 if the item is not re-sold by then), and the like.

Other Types of Data

Although not shown in FIG. 1, the network provider 110 may maintain other types of data, for example, such as invoice data, transaction data, and the like.

Data Repository

The data repository 120 may be implemented on a single storage device or across multiple storage devices. The user data 122, item data 124, store data 126, inventory data 128, and return data 129 may be stored in a single database or across multiple databases.

Database Entries

The data repository 120 may include one or more databases for storing data generated within the communication network 111. For example, the user data 122 may be stored in a user database having a set of database entries, the item data 124 may be stored in an item database having a set of database entries, the store data 126 may be stored in a store database having a set of database entries, the inventory data 128 may be stored in an inventory database having a set of database entries, and the return data 129 may be stored in a return database having a set of database entries. Each user, item, or store in the communication network 111 may have a corresponding database entry in the one or more databases. Links or associations may be created between certain database entries using a primary key that is common to both or all of such database entries.

Network Portal

The network portals 130 are online stores of the retailers within the communication network 111. The network portals 130 described herein may include any set of network pages, screens, presentations, screen representations, content, etc. that can be used to allow visitors/viewers to browse and purchase items. In some implementations, the network portals 130 are accessible using uniform resource locators (URLs) or other addresses. Each network portal 130 may include one or more network pages dedicated to the individual purchasable item available via the network portal. Such a network page may include details regarding the particular item, such as one or more pictures of the item, a description of the item, a price of the item, etc. The network portal 130 and its individual network pages may be created by the network provider 110 at the direction of the owner (e.g., retailer within the communication network 111) of the network portal, for example, via a user interface provided by the network provider's web page or mobile application).

User Interface

The network provider 110 may provide the user devices 102 with one or more user interfaces for utilizing one or more network services provided by the network provider 110 (e.g., to upload, share, and browse content and/or items, to configure network portals, to perform transactions such as purchase items, etc.). The user devices 102 may have a browser application implemented thereon or a mobile application dedicated to the network provider 110 that uses text, graphics, audio, video, and other media to present data and to allow interaction with the network provider 110.

Product Filters

To facilitate the sharing of items by the retailers within the communication network, the network provider 110 may present user interface tools usable by a given retailer to configure the filters for identifying one or more of the shared items to be displayed on the given retailer's network portal and made visible by the visitors of the given retailer's network portal. For example, a retailer may configure a product filter to specify that yellow shirts in the price range of $20-$35 should be imported into the retailer's network portal. As another example, the retailer may configure a product filter by specifying the product identifiers of the products that the retailer wishes to import into the retailer's network portal. When a customer visits the retailer's network portal, the provider network allows the customer to see one or more of the products from the communication network that satisfy the retailer's product filter, along with the retailer's own products, if any. In some implementations, instead of using filters, the selling retailer can manually select the shared products from the sharing retailer's online store.

Products to be Shown on Network Portal

The network provider 110 may maintain information regarding which online stores should list which items stored in the data repository 120. For example, the network provider 110 may periodically generate and update such a list based on the retailer's manual selection or product filters as needed. Alternatively, the list of products may be dynamically generated on the fly at the time a customer visits a given online store, using the store owner's product filter without previously storing such a list of products in the data repository 120.

Other Components

Each of the devices 102 may be a desktop computer, a laptop computer, a portable computing device, a smartphone, a tablet computer, or any other computing device. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks such as the Internet. Protocols and components for communicating via the Internet or any of the other aforementioned types of communication networks are well known to those skilled in the art and, thus, are not described in more detail herein.

Workflow #1

Figure 2:
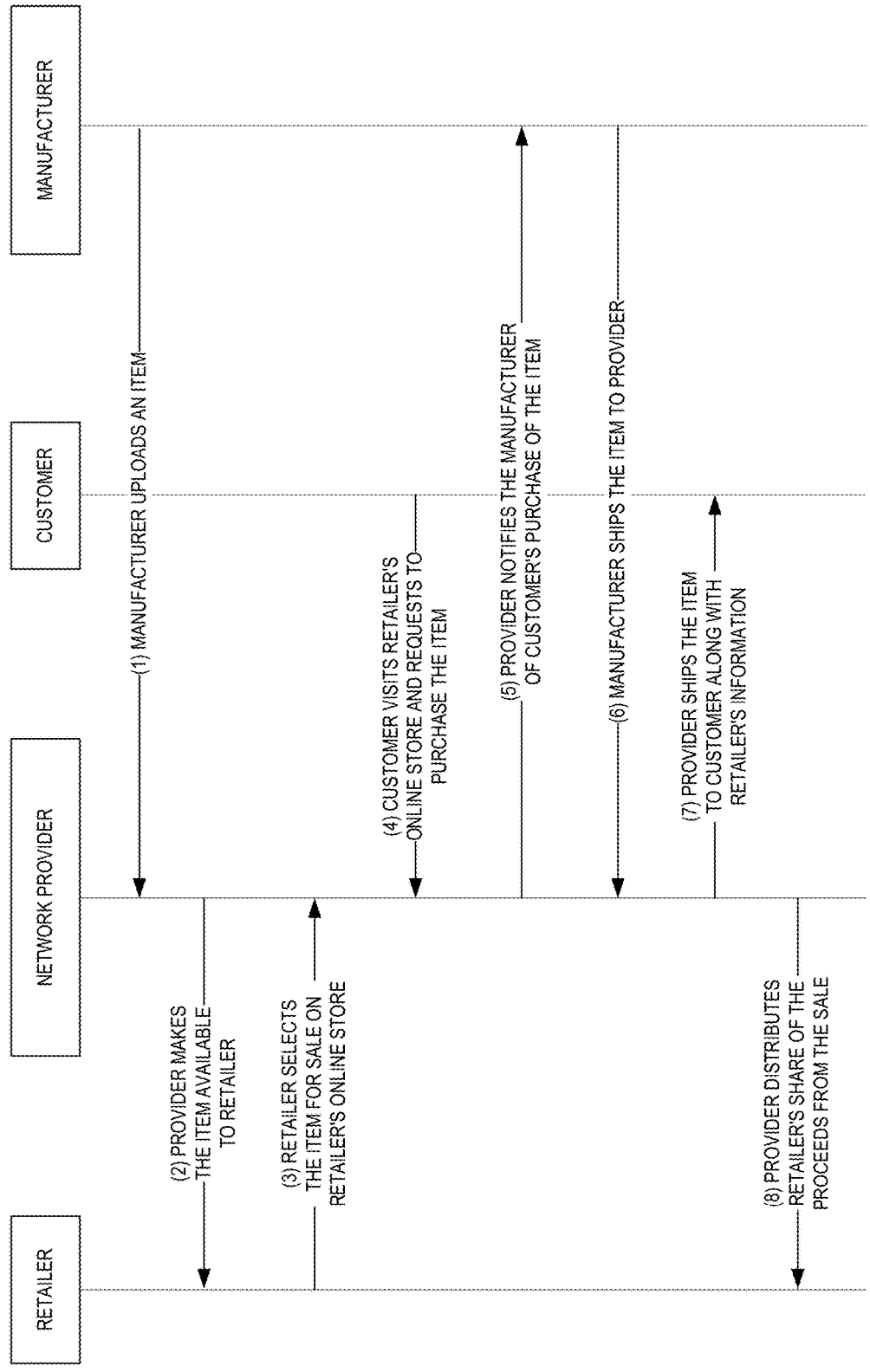
FIG. 2 depicts a workflow diagram illustrating the interactions between the various entities in accordance with aspects of the present disclosure.

With reference to FIG. 2, an example workflow diagram illustrating the interactions between the various entities in the network of the network provider 110 in accordance with aspects of the present disclosure is described. At (1), a manufacturer uploads an item. The item may be a product manufactured by the manufacturer that the manufacturer wishes to sell via the communication network 111. At (2), the network provider makes the item available to a retailer within the communication network 111. At (3), the retailer selects the item for sale on the retailer's online store. Upon the retailer's selection of the item, the network provider may create or update one or more relevant database entries in the data repository 120 to indicate that the item should be visible and purchasable on the retailer's online store. For example, the network provider may add an entry to a database table that includes the list of items that are available for sale on the retailer's online store along with the manufacture's item's item identifier and other item information.

At (4), a customer visits the retailer's online store and requests to purchase the item. In response, at (5), the network provider notifies the manufacturer of the customer's purchase of the item. In response, at (6), the manufacturer ships the item to the network provider. At (7), the network provider ships the item to the customer along with the retailer's information (e.g., the retailer's store name, contact information, return policy, etc.). At (8), the network provider distributes the retailer's share of the proceeds from the sale of the item (e.g., using the payment received from the customer at the time of purchase).

Workflow #2

Figure 3:
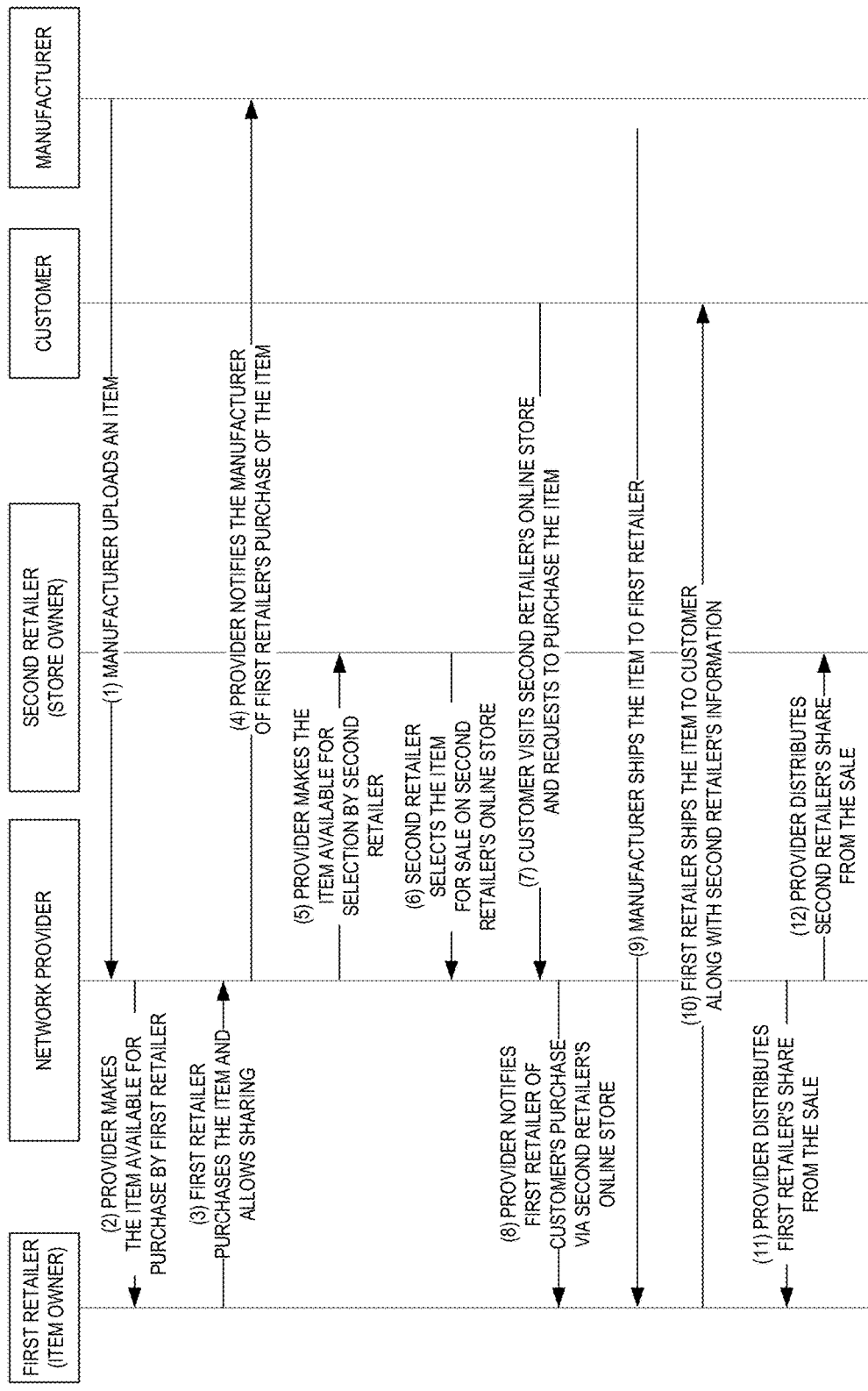
FIG. 3 depicts another workflow diagram illustrating the interactions between the various entities in accordance with aspects of the present disclosure.

With reference to FIG. 3, another example workflow diagram illustrating the interactions between the various entities in the network of the network provider 110 in accordance with aspects of the present disclosure is described. At (1), a manufacturer uploads an item. The item may be a product manufactured by the manufacturer that the manufacturer wishes to sell via the communication network 111. At (2), the network provider makes the item available for purchase by a first retailer within the communication network 111. At (3), the first retailer purchases the item and allows the item to be shared to other retailers within the communication network 111. Upon the first retailer's purchase of the item, the network provider may create or update one or more relevant database entries in the data repository 120 to indicate that the item is now owned by the first retailer, that the item should be visible and purchasable on the first retailer's online store, that the item is shared with other retailers within the communication network 111, and that the first retailer now has available inventory of the first item. For example, the network provider may add or update a relevant entry to a database table, where the entry includes the item's owner (e.g., first retailer), available quantity (e.g., to reflect the number of units purchased from the manufacturer), whether to display the item on the first retailer's online store, whether the item is to be shared with other retailers (e.g., shared), etc.

At (4), the network provider notifies the manufacturer of the first retailer's purchase of the item, and at (5), the provider makes the item available for selection by a second retailer for sale on the second retailer's online store. At (6), the second retailer selects the item for sale on the second retailer's online store. At (7), a customer visits the second retailer's online store and requests to purchase the item. In response, at (8), the network provider notifies the first retailer of the customer's purchase of the item via the second retailer's online store, along with shipping information of the customer. Although not illustrated, the network provider may also notify the second retailer of the customer's purchase of the item via the second retailer's online store.

At (9), the manufacturer ships the item to the first retailer. At (10), the first retailer ships the item to the customer along with the second retailer's information (e.g., the second retailer's store name, contact information, return policy, etc.). At (11), the network provider distributes the first retailer's share of the proceeds (e.g., retail price minus fees/commissions) from the sale of the item (e.g., using the payment received from the customer at the time of purchase). At (12), the network provider distributes the second retailer's share of the proceeds (e.g., commission for facilitating the sale via its online store) from the sale of the item (e.g., using the payment received from the customer at the time of purchase).

Workflow #3

Figure 4:
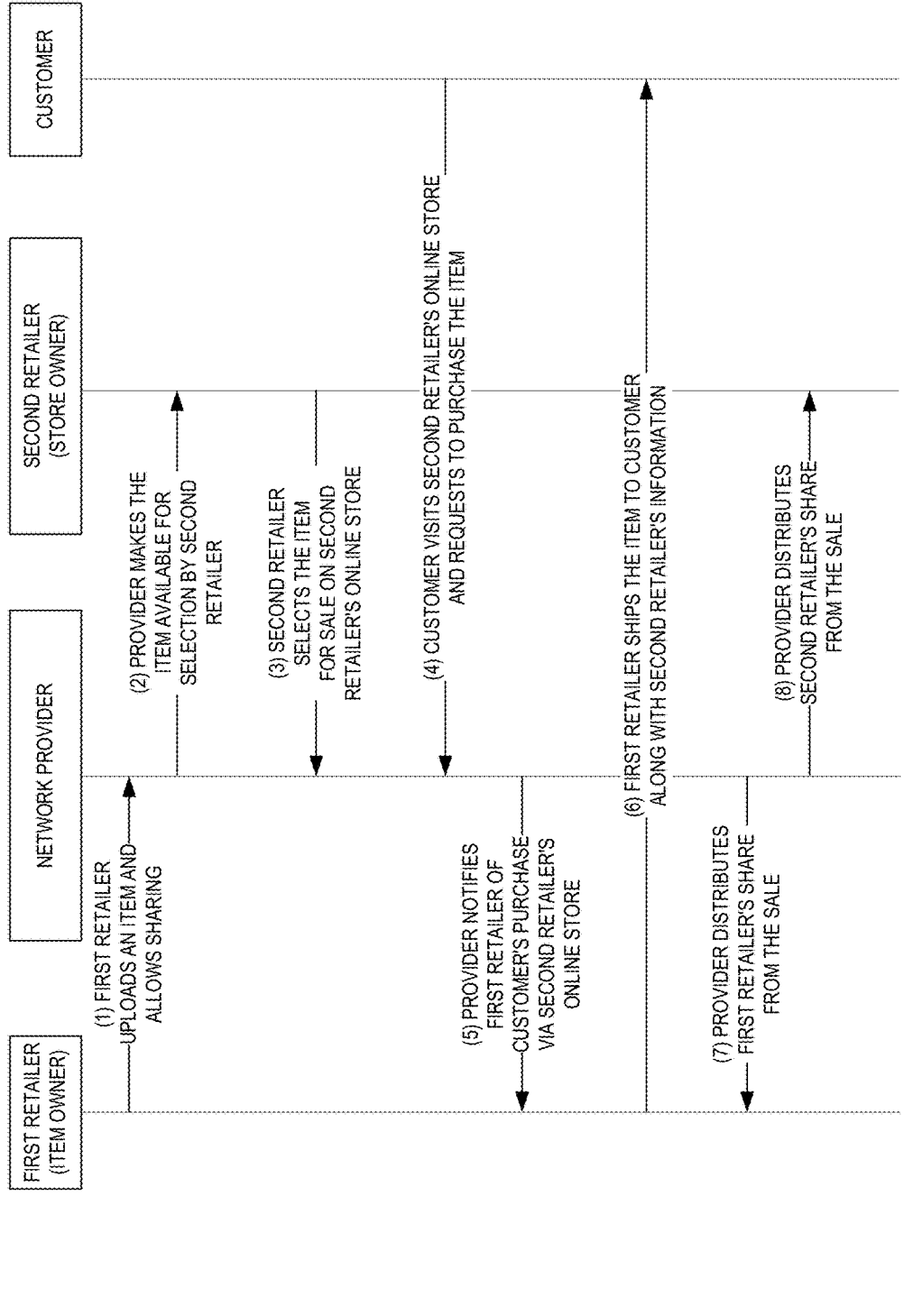
FIG. 4 depicts yet another workflow diagram illustrating the interactions between the various entities in accordance with aspects of the present disclosure.

With reference to FIG. 4, yet another example workflow diagram illustrating the interactions between the various entities in the network of the network provider 110 in accordance with aspects of the present disclosure is described. At (1), the first retailer uploads an item and allows the item to be shared to other retailers within the communication network 111. The item may be a product made by the first retailer or acquired by the first retailer from an entity outside the communication network 111. Upon the first retailer's upload of the item, the network provider may create or update one or more relevant database entries in the data repository 120 to indicate that the item is now owned by the first retailer, that the item should be visible and purchasable on the first retailer's online store, that the item is shared with other retailers within the communication network 111, and that the first retailer now has available inventory of the first item. For example, the network provider may add or update a relevant entry to a database table, where the entry includes the item's owner (e.g., first retailer), quantity available for sale (e.g., to reflect the number of units indicated by the first retailer), quantity in inventory (e.g., to reflect the number of units indicated by the first retailer), whether to display the item on the first retailer's online store, whether the item is to be shared with other retailers (e.g., shared), etc.

Upon determining that the uploaded item is to be shared with other retailers within the communication network 111, at (2), the network provider makes the item available for selection by a second retailer for sale on the second retailer's online store. At (3), the second retailer selects the item for sale on the second retailer's online store. At (4), a customer visits the second retailer's online store and requests to purchase the item. In response, at (5), the network provider notifies the first retailer of the customer's purchase of the item via the second retailer's online store, along with shipping information of the customer. Although not illustrated, the network provider may also notify the second retailer of the customer's purchase of the item via the second retailer's online store.

At (6), the first retailer ships the item to the customer along with the second retailer's information (e.g., the second retailer's store name, contact information, return policy, etc.). At (7), the network provider distributes the first retailer's share of the proceeds (e.g., retail price minus fees/commissions) from the sale of the item (e.g., using the payment received from the customer at the time of purchase). At (8), the network provider distributes the second retailer's share of the proceeds (e.g., commission for facilitating the sale via its online store) from the sale of the item (e.g., using the payment received from the customer at the time of purchase).

Retailers Sign Up

Retailers A and B each sign up for a user account with the network provider 110 and operate an online store via the network provider 110.

Retailer Uploads Item to Retailer's Own Store

Retailer A wants to sell a leather belt on his online store. Retailer A provides the leather belt's name, description, make/model, and picture(s) and specifies the quantity Retailer A has available for sale. The network provider 110 creates an item entry in its item database, assigns a unique ID to Retailer A's leather belt, fills in the information provide by Retailer A such as the leather belt's name, description, make/model, picture(s), etc., if the leather belt is being submitted to the network provider 110 for the first time. The network provider 110 also creates an inventory entry in its inventory database with the unique ID assigned to the leather belt, and fills in the quantity and the owner (Retailer A). For example, the network provider 110 may add Retailer A's unique ID to the inventory entry to indicate that Retailer A is the owner of the item corresponding to the inventory entry (i.e. the leather belt).

Retailer Shares Uploaded Item with Other Retailers

Retailer A also wants to share the leather belt with other retailers in the communication network 111 and thus allow Retailer A's leather belt to be sold by such other retailers at their respective online stores. The network provider 110 updates the item entry corresponding to the leather belt to indicate that the leather belt is also available for sale by retailers other than Retailer A.

Retailer Selects Item Purchased from Manufacturer

Retailer B wants to sell, on his own online store, a dress shirt that he purchased from a manufacturer in the communication network 111. Since the dress shirt was purchased via the network provider 110, the item database may already have an item entry corresponding to the dress shirt, and the network provider 110 may not need to create a new item entry for the dress shirt. The network provider 110 creates another inventory entry in its inventory database, assigns a unique ID to Retailer B's dress shirt, fills in the information extracted from the purchase of the dress shirt (the network provider 110 has access to this information since the purchase occurred via the network provider 110) such as the dress shirt's name, description, make/model, picture(s), quantity, and specifies in the inventory entry that the owner of the dress shirt is Retailer B (e.g., by adding Retailer B's unique ID to the inventory entry).

Retailer Selects Item Shared by Another Retailer

Retailer B also wants to sell the leather belt shared by Retailer A on his own online store (Retailer B's online store). Using a user interface provided by the network provider 110, Retailer B creates a filter that allows items of the other retailers in the communication network 111 to be displayed on Retailer B's online store. The filter may specify the item type, color, price range, retailer ID, item ID, and/or any combination thereof. Shared items that satisfy Retailer B's filter are displayed on Retailer B's online store as if they were Retailer B's own items.

Customer Visits Retailer's Online Store

Customer X visits Retailer B's online store. In response, the network provider 110 generates an item page that is displayed on Customer X's terminal display screen, using Retailer B's filter and the information stored in the databases of the network provider 110. The item page includes Retailer B's own items (including the dress shirt), as well as other shared items that do not belong to Retailer B but satisfy Retailer B's filter such as Retailer A's leather belt. Retailer A's leather belt can be viewed and purchased by Customer X on Retailer B's online store as if it were Retailer B's own item. In other words, Customer X cannot tell that the leather belt does not belong to the owner of the online store (i.e. Retailer B).

Customer Browses Store Owner's and Other Retailer's Items

If Customer X visits Retailer B's online store and conducts a keyword search for "belt", the network provider 110 generates a search result page that is displayed on Customer X's terminal display screen, and the search result page includes both Retailer A's leather belt as well as other belts available for purchase on Retailer B's online store (e.g., Retailer A's own belts and/or belts belonging to other retailers) but does not include belts available for purchase in the communication network 111 that do not satisfy Retailer B's filter.

Central Website for Browsing and Searching All Online Stores

In some implementations, the network provider 110 may provide a central web page for browsing and searching some or all of the online stores registered with the network provider 110. For example, if Customer X conducts a keyword search for "belt" on such a central web page, the network provider 110 generates a search result page that is displayed on Customer X's terminal display screen, and the search result page includes Retailer A's leather belt and other belts available for purchase via the network provider 110. For example, the search result page may include all the belts that would have been displayed had Customer X conducted the keyword search on Retailer B's online store instead, and additional belts that do not satisfy Retailer B's filter.

Customer Purchases Another Retailer's Item from Store Owner Retailer's Online Store Customer X places a specific quantity of Retailer A's leather belt into his electronic shopping cart provided on Retailer B's online store. Subsequently, Customer X purchases Retailer A's leather belt from Retailer B's online store for the specific quantity.

Network Provider Receives Money from Customer

The network provider 110 receives money from Customer X for the purchase of Retailer A's leather belt on Retailer B's online store.

Network Provider Generates Log Entry for Customer's Transaction

The network provider 110 generates a log entry for the sales transaction that says "Retailer A's leather belt was purchased by Customer X from Retailer B's store."

Network Provider Sends Transaction Confirmation to Customer

The network provider 110 generates and sends a purchase confirmation statement to Customer X. The purchase confirmation statement indicates that Customer X purchased the leather belt from Retailer B's online store, and includes transaction details such as the quantity, price, and payment receipt. However, Customer X cannot tell from the purchase confirmation receipt that the leather belt that he purchased is actually owned by someone other than Retailer B.

Network Provider Updates Inventory Database to Reflect Transaction

The network provider 110 updates the inventory database to update the quantity of Retailer A's leather belt available for sale on the individual online stores provided by the network provider 110. For example, the network provider's inventory database indicates that, among the total quantity of Retailer A's leather belt in inventory (e.g., the quantity actually sitting in Retailer A's warehouse), the quantity of Retailer A's leather belt purchased by Customer X is not available for sale.

Transactions via Other Online Stores May Exhaust Item Owner's Available Inventory If Customer X purchased all of the available quantity of Retailer A's leather belt, the network provider 110 sets the available quantity in the inventory entry associated with Retailer A's leather belt to zero so that Retailer A's leather belt no longer appears on any retailer's online store going forward (until Retailer A restocks).

Network Provider Sends Shipping Notification to Item Owner Retailer

The network provider 110 sends a shipping notification to Retailer A indicating that Retailer A needs to ship a specified quantity of the leather belt to Customer X (with whom Retailer A has no relationship) for a sale that Retailer B (with whom Retailer A also has no relationship) made from Retailer B's own online store. The shipping notification also includes the shipping address of Customer X.

Item Owner Ships Purchased Item to Customer with Store Owner's Information

Retailer A ships the purchased quantity of the leather belt to Customer X. In some implementations, Retailer A ships the leather belt with Retailer B's information (e.g., instead of Retailer A's information). In other implementations, Retailer A ships the leather belt with Retailer A's information.

Network Provider Updates Inventory Database to Reflect Shipping

After shipping, Retailer A tells network provider 110 that the purchased leather belt has been shipped. The network provider 110 (an entity different from the entity doing the shipping) updates the inventory database by reducing the total quantity of Retailer A's leather belt in inventory by the purchased and shipped quantity of Retailer A's leather belt. In other implementations, Retailer A provides the updated inventory information to the network provider 110 and the network provider 110 updates the inventory database accordingly.

Network Provider Distributes Proceeds from Transaction to Item Owner Who Didn't Sell Item The network provider 110 sends a portion of the money received from Customer X to the owner of the purchased leather belt (Retailer A) even though the sale was made by another retailer (Retailer B) via that retailer's own online store.

Network Provider Distributes Proceeds from Transaction to Store Owner Who Doesn't Own Item The network provider 110 sends a portion of the money received from Customer X to the owner of the online store from which the leather belt was purchased (Retailer B) even though the leather belt was owned by someone other than the owner of the online store.

Quantity Available for Purchase Vs. Inventory Quantity

As discussed above, the network provider 110 updates the database to reflect the reduction in the quantity available for purchase (e.g., quantity not yet sold), and also updates the database to reflect the reduction in the quantity in inventory (e.g., quantity not yet shipped).

Return Process

After Customer Y purchases an item from a network store of a retailer within the communication network 111, she may have the option of returning the item. Depending on the return options associated with the item (e.g., specified at the time the original owner of the item uploaded the item onto the network store of the original owner within the communication network 111, or as default options provided by the network provider 110), Customer Y may be able to return the item by mailing the item to the original owner, mailing the item to another retailer within the communication network 111, mailing the item to a location/address associated with the network provider 110, physically dropping off the item at a physical location associated with the original owner, physically dropping off the item at a physical location associated with another retailer within the communication network 111, or physically dropping off the item at a physical location associated with the network provider 110.

Return Options

In some embodiments, the return options associated with a given item or network resource includes (i) a return location option indicating one or more locations and delivery methods via which the item can be returned (e.g., whether the item can be returned to the owner's location, another retailer's location, or the network provider's location, and whether the item can be mailed or physically dropped off), (ii) a sell option indicating whether or not the item can be re-sold by the recipient of the returned item, if the recipient is not the owner of the item. Regarding the sell option, the recipient may be allowed to select one of the following options: (a) send the returned item to the owner with the return label provided by the owner, (b) send the returned item to the warehouse of the network provider 110, (c) try to sell the returned item to the recipient's customers at her physical store or via her online store for a timeout period/window, and if the returned item does not sell within the timeout period/window, send the item to the owner (or another location designated by the item owner, such as the warehouse of the network provider 110), or (d) keep the returned item at a discounted price and try to sell the returned item to the recipient's customers at her physical store or via her online store (e.g., without having to ever return it to the previous owner).

Workflow #4

Figure 5A:
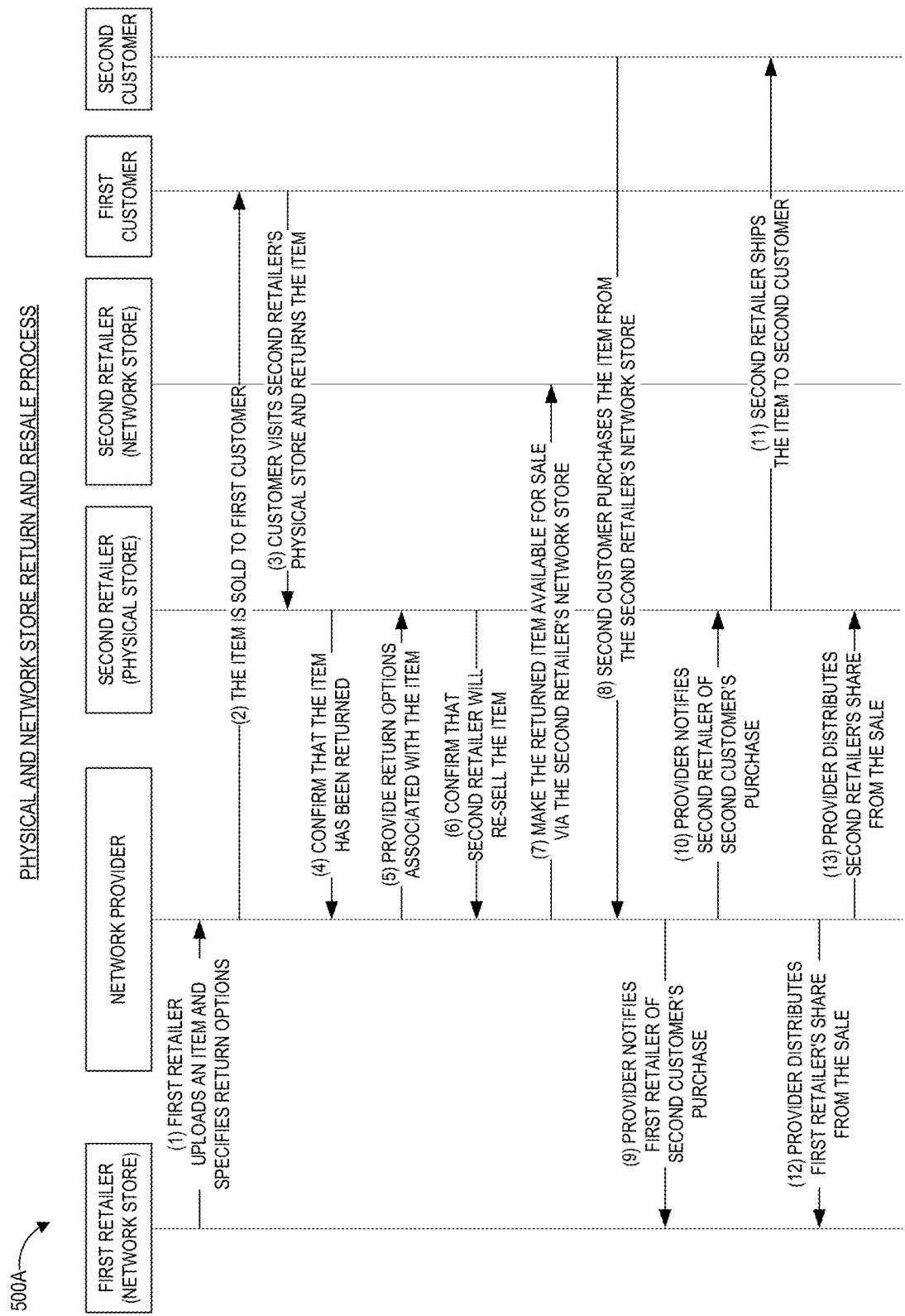
FIG. 5A depicts yet another workflow diagram illustrating the interactions between the various entities in accordance with aspects of the present disclosure.

With reference to FIG. 5A, yet another example workflow diagram illustrating the interactions between the various entities in the network of the network provider 110 in accordance with aspects of the present disclosure is described. At (1), the first retailer uploads an item and specifies return options. The item may be a product made by the first retailer or acquired by the first retailer from an entity outside the communication network 111. Upon the first retailer's upload of the item, the network provider may create or update one or more relevant database entries in the data repository 120 to indicate that the item is now owned by the first retailer, that the item should be visible and purchasable on the first retailer's online store, that the item is shared with other retailers within the communication network 111, that the first retailer now has available inventory of the first item, and that the item should be returned or otherwise transferred according to the specified return options. For example, the network provider may add or update a relevant entry to one or more database tables, where the entry includes the item's owner (e.g., first retailer), quantity available for sale (e.g., to reflect the number of units indicated by the first retailer), quantity in inventory (e.g., to reflect the number of units indicated by the first retailer), whether to display the item on the first retailer's online store, whether the item is to be shared with other retailers (e.g., shared), whether the item can be returned to a physical store of another retailer, whether the item can be re-sold by the owner of the physical store, the timeline during which such resale should take place, etc.

At (2), the item is sold to a first customer via, for example, the network store of the first retailer. At (3), the first customer visits a second retailer's physical store and returns the item. At (4), the second retailer confirms that the item has been returned to the physical store of the second retailer. At (5), the network provider provides the return options associated with the item to the second retailer. At (6), the second retailer confirms that the second retailer will re-sell the item to its customers. In response, at (7), the network provider makes the returned item available for sale via the second retailer's network store.

At (8), the second customer purchases the item from the second retailer's network store. At (9), the network provider notifies the first retailer of the second customer's purchase. At (10), the network provider notifies the second retailer of the second customer's purchase. At (11), the second retailer ships the item to the second customer. At (12), the network provider distributes the first retailer's share of the proceeds (e.g., profit minus the commissions given to the first retailer for facilitating the sale) from the sale of the item (e.g., using the payment received from the customer at the time of purchase). At (13), the network provider distributes the second retailer's share of the proceeds (e.g., commission for facilitating the sale via its online store) from the sale of the item (e.g., using the payment received from the customer at the time of purchase).

Example Network Resource Transfer and Re-Transfer Process

Figure 5B:
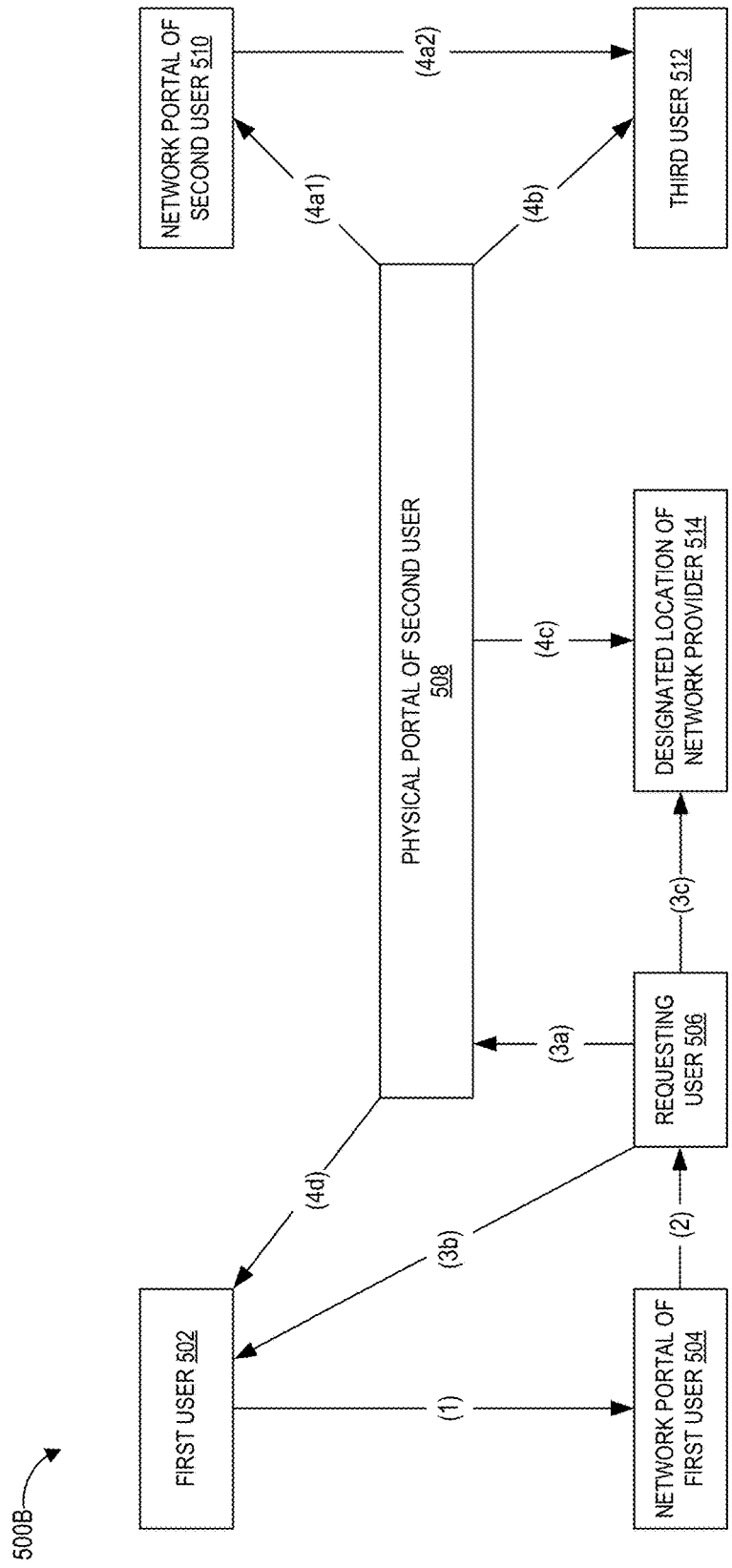
FIG. 5B depicts a block diagram illustrating an example of a network resource transfer and re-transfer process in accordance with aspects of the present disclosure.

With reference to FIG. 5B, an example of a network resource transfer and re-transfer process in accordance with aspects of the present disclosure is described. As shown in block diagram 500B, at (1), a first user 502 may provide a network resource to the network portal 504 of the first user (e.g., via the network provider 110). For example, the first user may upload a physical product to the first user's network portal using a user interface provided by the network provider 110. Along with the network resource, the first user may also specify one or more transfer options associated with the network resource that govern how the network resource may be transferred or subsequently re-transferred after the initial acquisition. For a physical product, the transfer options may govern where and how the physical product may be returned, and how and whether the returned physical product may be re-sold and/or shipped to other entities. The transfer options may govern the manner in which the physical possession and/or ownership can be transferred. If the transfer options are not specified at the time of providing the network resource (e.g., via the user interface provided by the network provider 110), the network resource may be associated with default options and transferred and subsequently re-transferred according to such default options.

In some embodiments, the return options may indicate (i) the location or entity to which the physical possession of the network resource is allowed to be transferred, (ii) the entity to which the ownership of the network resource is allowed to be transferred, (iii) whether a transfer recipient (e.g., second user in FIG. 5B) is allowed to subsequently transfer the transferred network resource to an entity other than the original owner of the network resource (e.g., first user 502 in FIG. 5B), (iv) a timeout window after which a transfer recipient (e.g., second user in FIG. 5B) is to transfer the transferred network resource to a location or entity (e.g., a physical or virtual location, warehouse, staging area associated with the network provider 110) designated by the original owner of the network resource (e.g., first user 502), and/or (v) a cost or cost range at which a transfer recipient (e.g., second user in FIG. 5B) is allowed to transfer the ownership of the transferred network resource to the transfer recipient itself from the original owner of the network resource (e.g., first user 502).

With continued reference to FIG. 5B, once the network resource has been provided to the network portal of the first user, at (2), a requesting user 506 acquires the network resource via the network portal 504. At (3a), the requesting user transfers the network resource to a physical portal 508 of a second user. Alternatively, at (3b), the requesting user may transfer the network resource back to the original owner of the network resource, the first user 502. In yet another scenario, at (3c), the requesting user may transfer the network resource to a designated location 514 of the network provider 110.

At (4a1), the network resource is made accessible via the network portal 510 of the second user (e.g., by the network provider 110), and at (4a2), the network resource may subsequently be transferred to (or acquired by) a third user 512 via the second user's network portal 510. Alternatively, at (4b), the network resource may be transferred to (or acquired by) the third user 512 via the second user's physical portal 508. In yet another scenario, at (4c), the network resource may be transferred to a designated location 514 of the network provider 110. In yet another scenario, the network resource may be transferred back to the original owner of the network resource, the first user 502. In some cases, (4c) and (4d) may take place in response to the time elapsed since the network resource was transferred to the second user's physical portal 508 having reached or exceeded a threshold amount of time that the second user is given to re-transfer the network resource to an entity other than the first user 502. In other cases, instead of transferring the physical possession of the network resource to the first user 502 or the designated location 514, the second user keeps the physical possession of the network resource and transfers the ownership of the network resource from the first user to the second user (e.g., according to the transfer option specified by the first user or default transfer options).

Improvements to Database Update Method

As shown in FIGS. 5A and 5B, a network resource (e.g., resource made available via the network such as computing resource, digital resource, or physical resource) that has been acquired by one user can subsequently be transferred to another user. Such a network resource can subsequently be transferred to various different entities such as to the original owner of the network resource (e.g., first user 202 in FIG. 5B), another internal user of the communication network (e.g., second user's physical portal 508 and/or network portal 510 in FIG. 5B), a user outside the communication network (e.g., third user 512), the network provider (e.g., its designated location 514), and/or another physical location designated by one of those entities (not shown in FIG. 5B). Given these possibilities, a database update method that takes into account the various transfer options and keeps track of how the item is being transferred would be advantageous and is provided by the techniques described herein. These techniques are described in greater detail below with reference to FIGS. 6-8.

Process of Facilitating Transfer of Network Resource #1

Figure 6:
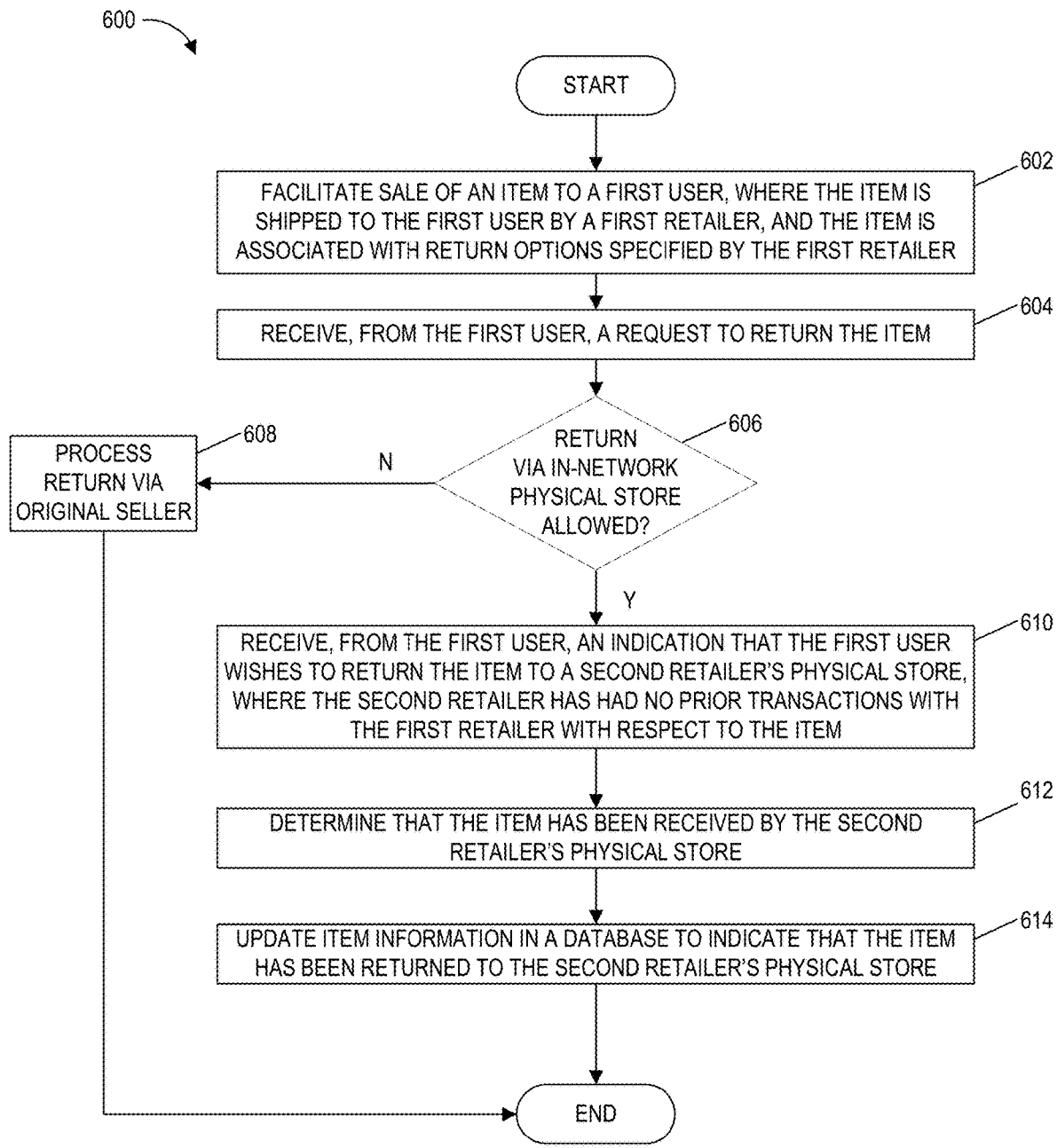
FIG. 6 is a flowchart of an example process for facilitating a transfer of a network resource via a physical portal in accordance with aspects of the present disclosure.

FIG. 6 depicts an illustrative process 600 for facilitating a transfer of a network resource via a physical portal in accordance with aspects of the present disclosure. The process 600 may be carried out, for example, by the network provider 110 (or a component thereof such as the resource ownership data manager 119). For convenience, some or all of the steps of the process 600 are described as being performed by the network provider 110. For example, the network provider 110 may include one or more hardware computing devices and non-transitory physical computer storage storing instructions that, when executed by the one or more hardware computing devices, cause the one or more hardware computing devices to perform the steps of the process 600.

The process 600 begins at block 602, where the network provider 110 facilitates the sale of an item to a first user, where the item is shipped to the first user by a first retailer, and the item is associated with return options specified by the first retailer.

At block 604, the network provider 110 receives, from the first user, a request to return the item.

At block 606, the network provider 110 determines whether returning the item via an in-network physical store is allowed. For example, the network provider 110 may access the database including information about the return options associated with the item to be returned. If the network provider 110 determines that returning the item via an in-network physical store is not allowed, the process 600 proceeds to block 608, where the network provider 110 processes the return via the original seller (e.g., the first retailer). Otherwise, the process 600 proceeds to block 610.

At block 610, the network provider 110 receives, from the first user, an indication that the first user wishes to return the item to a second retailer's physical store, where the second retailer has had no prior transactions with the first retailer with respect to the item.

At block 612, the network provider 110 determines that the item has been received by the second retailer's physical store. For example, when the item is physically dropped off at the second retailer's physical store and the barcode on the item is scanned by the scanner at the second retailer's physical store, a computing device at the second retailer's physical store may automatically transmit an indication to the network provider 110 that the item has been received at the second retailer's physical store. Subsequent to the scanning, as described above, the second retailer may be allowed to select one of the following options: (a) send the returned item to the owner with the return label provided by the owner, (b) send the returned item to the warehouse of the network provider 110, (c) try to sell the returned item to the recipient's customers at her physical store or via her online store for a timeout period/window, and if the returned item does not sell within the timeout period/window, send the item to the owner (or another location designated by the item owner, such as the warehouse of the network provider 110), or (d) keep the returned item at a discounted price and try to sell the returned item to the recipient's customers at her physical store or via her online store (e.g., without having to ever return it to the previous owner). The selected option may also be automatically sent to the network provider 110.

At block 614, the network provider 110 updates item information in a database to indicate that the item has been returned to the second retailer's physical store and to indicate the return/sell option selected by the second retailer. The process 600 may then end.

The process 600 can include fewer, more, or different blocks than those illustrated in FIG. 6 and/or one or more blocks illustrated in FIG. 6 may be modified, omitted, or switched without departing from the spirit and scope of the description. For example, each of one or more of the blocks in FIG. 6 may result in a database update that reflects the action performed at the block(s), the transfer status of the network resource, and/or location or ownership status of the network resource. Moreover, it will be appreciated by those skilled in the art and others that some or all of the functions described in this disclosure may be embodied in software executed by one or more processors of the network provider 110 and/or the computing devices disclosed herein.

Process of Facilitating Transfer of Network Resource #2

Figure 7:
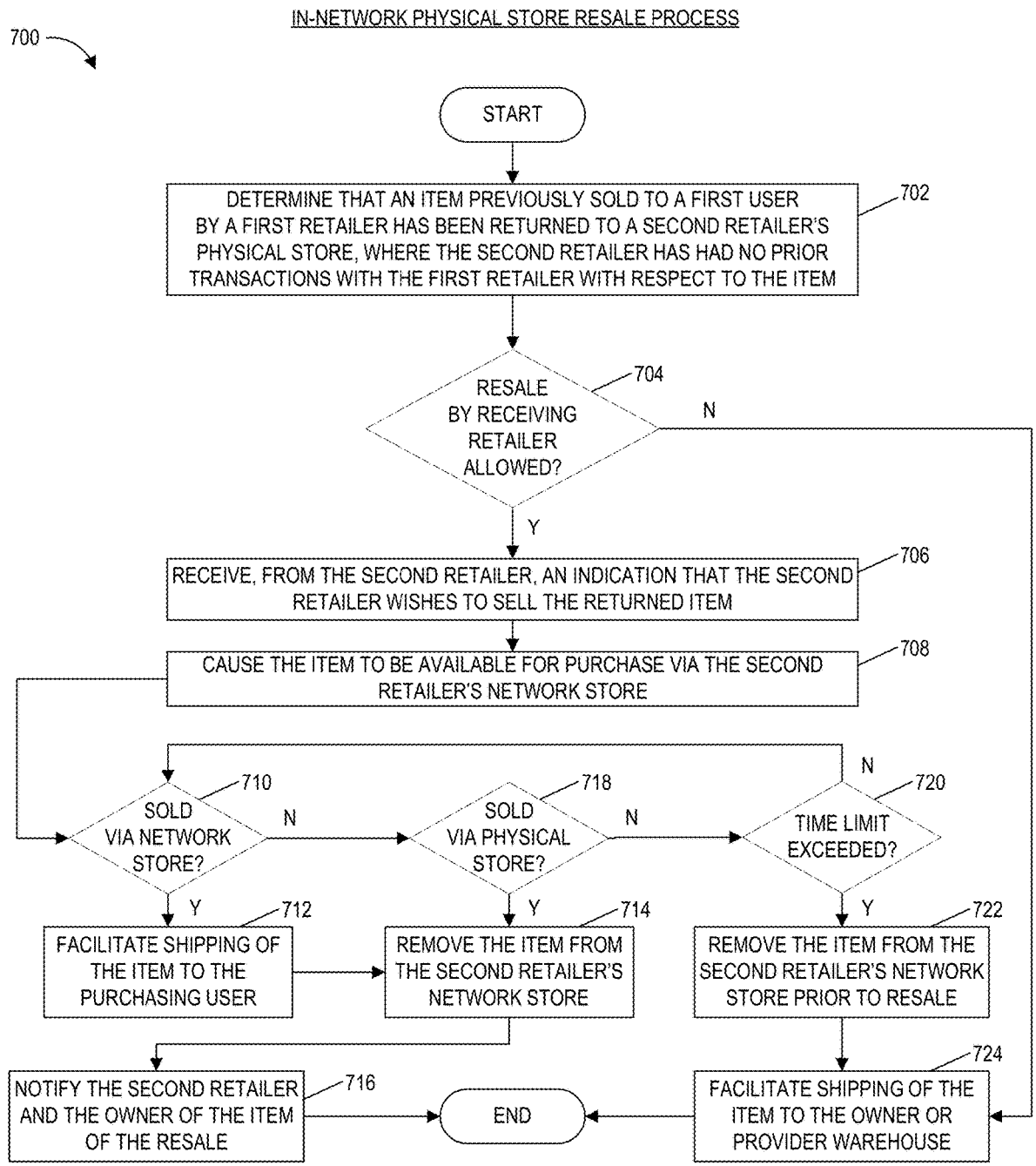
FIG. 7 is a flowchart of an example process for facilitating a subsequent re-transfer of a network resource via a physical portal in accordance with aspects of the present disclosure.

FIG. 7 depicts another illustrative process 700 for facilitating a subsequent re-transfer of a network resource via a physical portal in accordance with aspects of the present disclosure. The process 700 may be carried out, for example, by the network provider 110 (or a component thereof such as the resource ownership data manager 119). For convenience, some or all of the steps of the process 700 are described as being performed by the network provider 110. For example, the network provider 110 may include one or more hardware computing devices and non-transitory physical computer storage storing instructions that, when executed by the one or more hardware computing devices, cause the one or more hardware computing devices to perform the steps of the process 700.

The process 700 begins at block 702, where the network provider 110 determines that an item previously sold to a first user by a first retailer has been returned to a second retailer's physical store, where the second retailer has had no prior transactions with the first retailer with respect to the item. For example, when the item is physically dropped off at the second retailer's physical store and the barcode on the item is scanned by the scanner at the second retailer's physical store, a computing device at the second retailer's physical store may automatically transmit an indication to the network provider 110 that the item has been received at the second retailer's physical store.

At block 704, the network provider 110 determines whether resale by the receiving retailer (e.g., the second retailer) is allowed. For example, the network provider 110 may access the database including information about the return options associated with the returned item. If the network provider 110 determines that resale by the receiving retailer is not allowed, the process 700 proceeds to block 724. Otherwise, the process 700 proceeds to block 706.

At block 706, the network provider 110 receives, from the second retailer, an indication that the second retailer wishes to sell the returned item. For example, upon scanning of the returned item's barcode, the second retailer may be presented with the following options: (a) send the returned item to the owner with the return label provided by the owner, (b) send the returned item to the warehouse of the network provider 110, (c) try to sell the returned item to the recipient's customers at her physical store or via her online store for a timeout period/window, and if the returned item does not sell within the timeout period/window, send the item to the owner (or another location designated by the item owner, such as the warehouse of the network provider 110), or (d) keep the returned item at a discounted price and try to sell the returned item to the recipient's customers at her physical store or via her online store (e.g., without having to ever return it to the previous owner). The selected option may also be automatically sent to the network provider 110. In some cases, one or more of these options may not be available, depending on the return options specified by the owner of the item. For example, (c) and/or (d) may not be presented as options if the owner has not allowed re-sale of the returned item. The process 700 illustrates the example in which sell option (c) is selected by the second retailer.

At block 708, the network provider 110 causes the item to be available for purchase via the second retailer's network store.

At block 710, the network provider 110 determines whether the item has been sold via the second retailer's network store. If so, the process 700 proceeds to block 712. If not, the process 700 proceeds to block 718.

At block 718, the network provider 110 determines whether the item has been sold via the second retailer's physical store. If so, the process 700 proceeds to block 714. If not, the process 700 proceeds to block 720. Alternatively, if sell option (d) had been selected, process 700 would instead proceed to block 710.

At block 720, the network provider 110 determines whether the time elapsed has exceeded the time limit on reselling the item. If so, the process 700 proceeds to block 722. If not, the process 700 returns to block 710.

At block 712, the network provider 110 facilitates the shipping of the item to the purchasing user who has purchased the item via the second retailer's network store.

At block 714, the network provider 110 removes the item from the second retailer's network store.

At block 716, the network provider 110 notifies the second retailer and the owner of the item about the resale.

At block 722, the network provider 110 removes the item from the second retailer's network store prior to the item being resold.

At block 724, the network provider 110 facilitates the shipping of the item to its owner or the warehouse of the network provider 110. The process 700 may then end.

The process 700 can include fewer, more, or different blocks than those illustrated in FIG. 7 and/or one or more blocks illustrated in FIG. 7 may be modified, omitted, or switched without departing from the spirit and scope of the description. For example, each of one or more of the blocks in FIG. 7 may result in a database update that reflects the action performed at the block(s), the transfer status of the network resource, and/or location or ownership status of the network resource. Moreover, it will be appreciated by those skilled in the art and others that some or all of the functions described in this disclosure may be embodied in software executed by one or more processors of the network provider 110 and/or the computing devices disclosed herein.

Process of Facilitating Transfer of Network Resource #3

Figure 8:
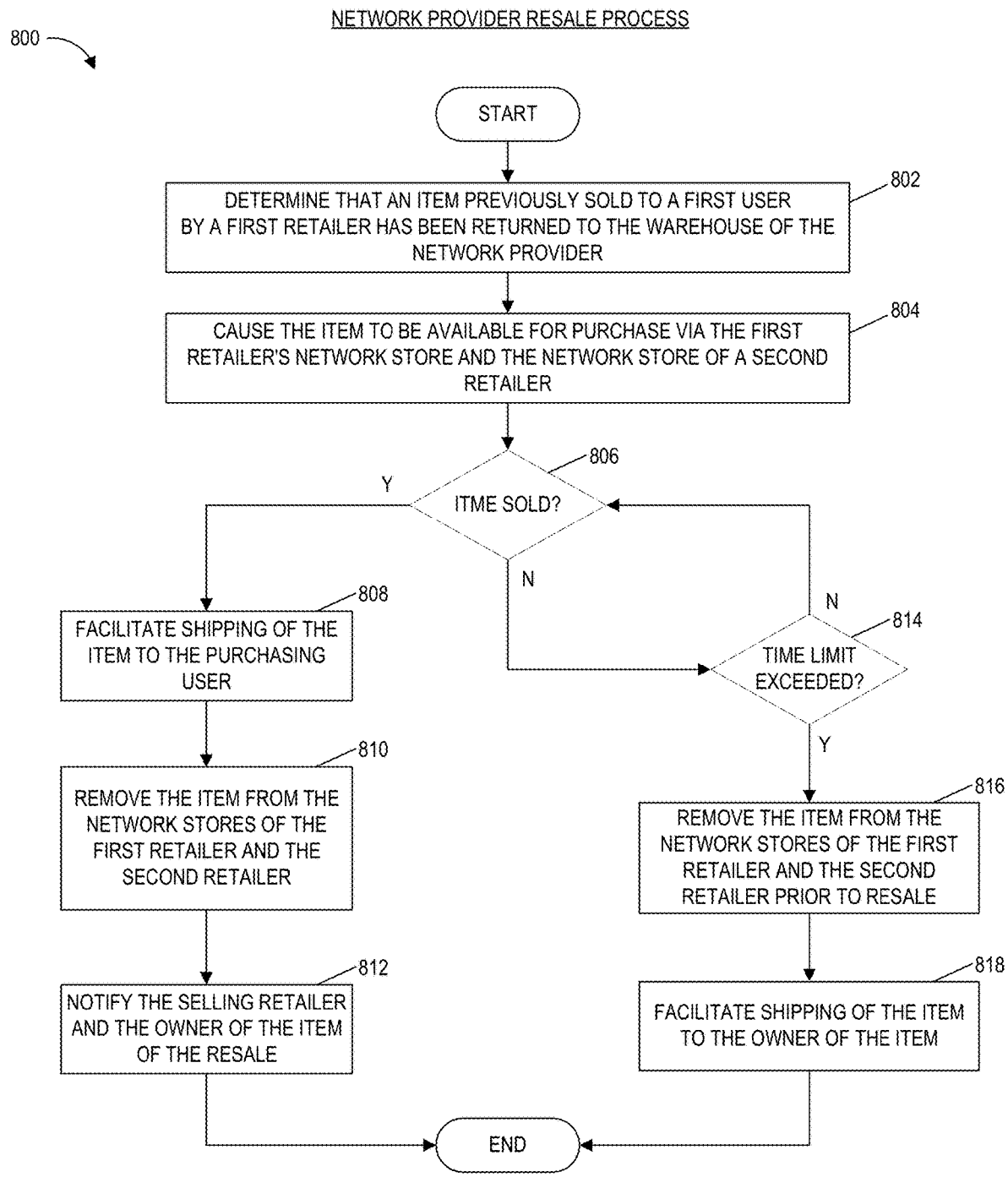
FIG. 8 is a flowchart of an example process for facilitating a subsequent re-transfer by a network provider in accordance with aspects of the present disclosure.

FIG. 8 depicts yet another illustrative process 800 for facilitating a subsequent re-transfer by a network provider in accordance with aspects of the present disclosure. The process 800 may be carried out, for example, by the network provider 110 (or a component thereof such as the resource ownership data manager 119). For convenience, some or all of the steps of the process 800 are described as being performed by the network provider 110. For example, the network provider 110 may include one or more hardware computing devices and non-transitory physical computer storage storing instructions that, when executed by the one or more hardware computing devices, cause the one or more hardware computing devices to perform the steps of the process 800.

The process 800 begins at block 802, where the network provider 110 determines that an item previously sold to a first user by a first retailer has been returned to the warehouse of the network provider 110.

At block 804, the network provider 110 causes the item to be available for purchase via the first retailer's network store and the network store of a second retailer.

At block 806, the network provider 110 determines whether the item has been sold. If so, the process 800 proceeds to block 808. If not, the process 800 proceeds to block 814.

At block 808, the network provider 110 facilitates the shipping of the item to the purchasing user.

At block 810, the network provider 110 removes the item from the network stores of the first retailer and the second retailer.

At block 812, the network provider 110 notifies the selling retailer and the owner of the item about the resale.

At block 814, the network provider 110 determines whether the time elapsed has exceeded the time limit on reselling the item. If so, the process 700 proceeds to block 816. If not, the process 700 returns to block 806.

At block 816, the network provider 110 removes the item from the network stores of the first retailer and the second retailer prior to a resale of the item.

At block 818, the network provider 110 facilitates the shipping of the item to its owner. The process 800 may then end.

The process 800 can include fewer, more, or different blocks than those illustrated in FIG. 8 and/or one or more blocks illustrated in FIG. 8 may be modified, omitted, or switched without departing from the spirit and scope of the description. For example, each of one or more of the blocks in FIG. 8 may result in a database update that reflects the action performed at the block(s), the transfer status of the network resource, and/or location or ownership status of the network resource. Moreover, it will be appreciated by those skilled in the art and others that some or all of the functions described in this disclosure may be embodied in software executed by one or more processors of the network provider 110 and/or the computing devices disclosed herein.

Example Computing Architecture of Network Provider

Figure 9:
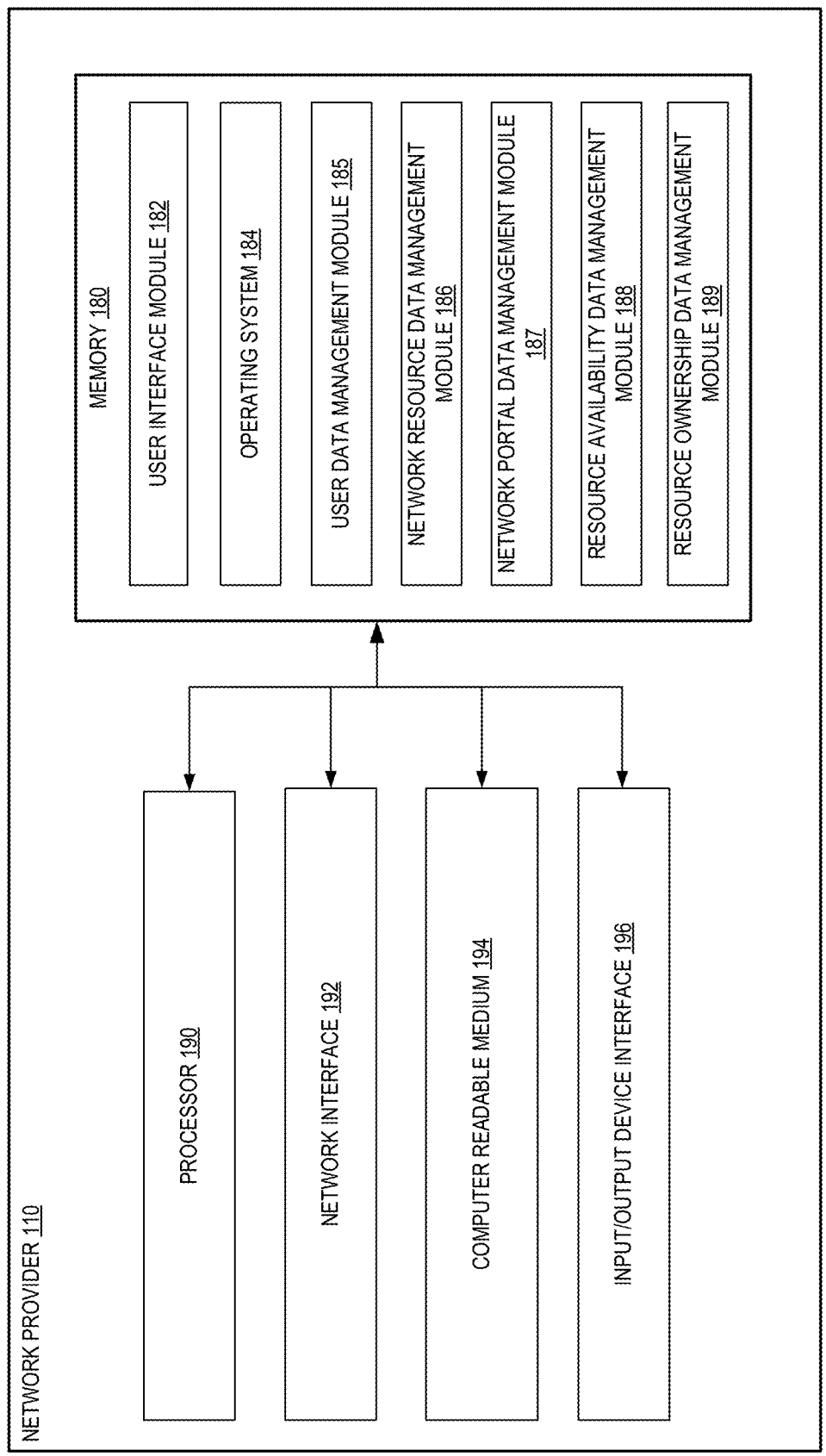
FIG. 9 depicts a general architecture of a computing device or system providing a network provider in accordance with aspects of the present disclosure.

FIG. 9 depicts an example architecture of the network provider 110 that can be used to perform one or more of the techniques described herein or illustrated in FIGS. 1-8 (or an example architecture of one or more computing devices that can be used to implement the network provider 110). The general architecture of the network provider 110 depicted in FIG. 9 includes an arrangement of computer hardware and software modules that may be used to implement one or more aspects of the present disclosure. The network provider 110 may include many more (or fewer) elements than those shown in FIG. 9. It is not necessary, however, that all of these elements be shown in order to provide an enabling disclosure. As illustrated, the network provider 110 includes a processor 190, a network interface 192, a computer readable medium 194, and an input/output device interface 196, all of which may communicate with one another by way of a communication bus. The network interface 192 may provide connectivity to one or more networks or computing systems. The processor 190 may also communicate with memory 180 and further provide output information for one or more output devices, such as a display, speaker, etc., via the input/output device interface 196, or provide responses or results over a network (e.g., network 104) via the network interface 192. Input to the network provider 110 may be received from one or more input devices such as a keyboard, mouse, digital pen, microphone, touch screen, gesture recognition system, or voice recognition system, or over a network via the network interface 192 (e.g., from another computing device within the communication network 111 or from a remote device such as the user devices 102).

The memory 180 may contain computer program instructions (grouped as modules in some implementations) that the processor 190 executes in order to implement one or more aspects of the present disclosure. The memory 180 may include RAM, ROM, and/or other persistent, auxiliary, or non-transitory computer-readable media. The memory 180 may store an operating system 184 that provides computer program instructions for use by the processor 190 in the general administration and operation of the network provider 110. The memory 180 may further include computer program instructions and other information for implementing one or more aspects of the present disclosure. For example, in one implementation, the memory 180 includes a user interface module 182 that generates user interfaces (and/or instructions therefor) for display, for example, via a browser or application installed on the user device 102.

In addition to and/or in combination with the user interface module 182, the memory 180 may include a user data management module 185, a network resource data management module 186, a network portal data management module 187, a resource availability data management module 188, and a resource ownership data management module 189 that may be executed by the processor 190. The operations and algorithms of the modules 185-189 are described in greater detail above with reference to FIGS. 1-8.

Although a single processor, a single network interface, a single computer readable medium, a singer input/output device interface, and a single memory are illustrated in the example of FIG. 9, in other implementations, the network provider 110 can have a multiple of one or more of these components (e.g., two or more processors and/or two or more memories).

Multiple Privacy Levels

A sharing retailer can configure privacy settings such that a product shared by the sharing retailer is shared only with other retailers within the communication network 111 who satisfy certain criteria. When the sharing retailer uploads a product onto his or her online store, the sharing retailer can specify that the product is (i) private (not shared), (ii) public (shared with all retailers), or (iii) semi-private (shared only with a subset of "permitted retailers" or "friends" who are specified by the sharing retailer or who have an existing relationship or association with the sharing retailer such as by being connected, being friends, or having the sharing retailer's prior approval).

Sharing with Permitted Retailers

Another retailer in the communication network 111 ("selling retailer") can visit the sharing retailer's online store and request to become the sharing retailer's permitted retailer. Upon the sharing retailer's approval, the selling retailer becomes the sharing retailer's permitted retailer and gains access to the products that the sharing retailer uploads semi-privately. The selling retailer can visit the sharing retailer's online store, and select a product that the sharing retailer has uploaded semi-privately and cause the product to be displayed on the selling retailer's own online store.

Re-Sharing of Shared Products

When the sharing retailer uploads a product, the sharing retailer can specify whether another retailer ("third-party retailer") who sees the shared product on the selling retailer's online store can then choose to sell the shared product on his or her own online store. If the third-party retailer is allowed to do so, the third-party retailer can select the shared product on the selling retailer's online store and cause the shared product to be displayed on the third-party retailer's own online store, even though the third-party retailer is not one of the sharing retailer's permitted retailers and the sharing retailer uploaded the shared item semi-privately (and thus the sharing retailer did not directly share the product with the third-party retailer, meaning that the third-party retailer would not have been able to import the shared product into the third-party retailer's own online store either from the sharing retailer's online store or using product filters satisfied by the shared product).

Placing Geographical Limitations on Physical Stores

When the sharing retailer uploads a product publicly or semi-privately, the sharing retailer can further specify that the product should not be shared with retailers who own physical stores in certain geographical regions ("Allow all retailers to sell this product on their own online stores, unless they own a physical store in Los Angeles"). For example, the geographical limitation can specify one or more states, cities, zip codes, countries, and etc. to be excluded. As another example, the geographical limitation can specify one or more states, cities, zip codes, countries, and etc. to be allowed. In some implementations, the geographical limitation can be specified in terms of a radius around the physical store of the sharing retailer. For example, the sharing retailer may specify that the product should be shared with other retailers who own a physical store within a 25 mi radius from the sharing retailer's physical store in Los Angeles should not be allowed (e.g., thereby preventing such other retailers from selling the product on their respective online stores).

Field of Use

Various implementations are described in the context of a network provider providing a network of online stores on behalf of its users and allowing the users to share items across the network. However, the implementations are not limited as such, and the techniques described herein may be extended to other industries or fields. For example, the techniques of the present disclosure may be applied to any platform that provides a network of web pages or resources via which transactions can occur.

Enumerated Implementations (EIs)

Some enumerated implementations (EIs) are provided in this section, without limitation.

EI 1: A method for facilitating item database updates, the method comprising: providing an item database storing item information associated with a plurality of items provided to a network provider by a plurality of retailers within a communication network of the network provider, wherein the network provider is configured to provide, to each retailer of the plurality of retailers, an online store accessible by the retailer's customers; receiving, from a first retailer of the plurality of retailers, a request to upload a first item onto the first retailer's online store, wherein the request specifies (i) a sharing option according to which the first item is to be shared across the plurality of retailers, and (ii) a return option according to which a return transaction of the first item is to be processed; causing the first item to be available for sale via at least the first retailer's online store; receiving, from a first visitor at the first retailer's online store, a request to purchase the first item; causing the first item purchased by the first visitor to be shipped to the first visitor; receiving, from the first visitor, an indication that the first visitor wishes to return the first item purchased via the first retailer's online store to an offline store of a second retailer of the plurality of retailers different from the first retailer; receiving, from the second retailer, an indication that the first item has been returned to the second retailer's offline store; updating, in the item database, an inventory location associated with the first item to the second retailer's offline store despite the second retailer not having had any prior transaction or agreement with the first retailer with respect to the first item; retrieving the return option associated with the first item, wherein the return option is specified by the first retailer; determining whether the return option associated with the first retailer indicates that the first item can be re-sold by one of the plurality of retailers within the communication network other than the first retailer; in response to determining that the return option indicates that the first item can be re-sold by one of the plurality of retailers within the communication network other than the first retailer, prompting the second retailer to indicate whether the second retailer wishes to re-sell the first item that has been returned to the second retailer's offline store; receiving, from the second retailer, an indication that the second retailer wishes to sell the first item returned to the second retailer's offline store; and causing the first item returned to the second retailer's offline store to be available for sale via the second retailer's online store provided by the network provider.

EI 2: The method of EI 1, further comprising: receiving, from a second visitor at the second retailer's online store, a request to purchase the first item returned to the second retailer's offline store; providing a digital transaction receipt to the second visitor, wherein the digital transaction receipt provides information about the second retailer along with information about the first item that belongs to the first retailer; causing the first item purchased by the second visitor to be shipped to the second visitor; and notifying the first retailer and the second retailer that the first item returned to the second retailer's offline store has been sold to the second visitor via the second retailer's online store.

EI 3: The method of EI 1, further comprising: receiving, from the second retailer, an indication that the first item returned to the second retailer's offline store has been sold to a second visitor at the second retailer's offline store; causing a physical transaction receipt to be provided to the second visitor, wherein the physical transaction receipt provides information about the second retailer along with information about the first item that belongs to the first retailer; and notifying the first retailer that the first item returned to the second retailer's offline store has been sold to the second visitor via the second retailer's online store.

EI 4: The method of EI 1, further comprising: determining, based on the return option associated with the first item, that the first item is allowed to be returned to an offline store of a retailer that is within the communication network of the network provider; outputting, to a computing device associated with the first visitor, a list of one or more retailers of the plurality of retailers within the communication network for selection by the first visitor as a location at which the first item is to be returned, wherein the list includes at least the second retailer's offline store.

EI 5: The method of EI 1, further comprising: prior to a resale of the first item that has been returned to the second retailer's offline store, determining that a condition for shipping the first item to the first retailer has been satisfied; and causing the first item to be shipped to the first retailer without a resale of the first item by the second retailer.

EI 6: The method of EI 1, further comprising: prior to a resale of the first item that has been returned to the second retailer's offline store, determining that a condition for shipping the first item to a warehouse of the network provider has been satisfied; and causing the first item to be shipped to the warehouse of the network provider without a resale of the first item by the second retailer.

EI 7: The method of EI 1, wherein the return option indicates a time period after which the first item is to be shipped to the first retailer if not yet resold by the second retailer.

EI 8: The method of EI 1, wherein a resale price at which the first item is available for purchase on the second retailer's online store is different from an original selling price at which the first item was purchased by the first visitor.

EI 9: The method of EI 1, further comprising outputting, to a computing device associated with the first retailer, a user interface for specifying the return option associated with the first item, wherein the user interface is configured to receive the first retailer's input regarding one or more of (i) whether the first item is allowed to be returned to another retailer's offline store, (ii) whether the first item is allowed to be re-sold by another retailer, and (iii) a time limit after which the first item is to be shipped to the first retailer or another location designated by the first retailer without a resale of the first item.

EI 10: The method of EI 1, further comprising determining that a unique identifier of the first item has been scanned by a physical scanner provided at the second retailer's offline store, wherein the physical scanner is configured to scan at least one other item that is available for purchase at the second retailer's offline store but is not available for purchase on the second retailer's online store.

EI 11: A system for facilitating inventory database updates, the system comprising: a network provider comprising one or more computing devices; an item database storing item information associated with a plurality of items provided to the network provider by a plurality of retailers within a communication network of the network provider; and a plurality of online stores provided by the network provider, wherein the plurality of online stores are each associated with a respective retailer of the plurality of retailers and accessible by the respective retailer's customers, wherein the network provider is configured to: receive, from a first retailer of the plurality of retailers, a request to upload a first item onto the first retailer's online store, wherein the request specifies (i) a sharing option according to which the first item is to be shared across the plurality of retailers, and (ii) a return option according to which a return transaction of the first item is to be processed; cause the first item to be available for sale via at least the first retailer's online store; receive, from a first visitor at the first retailer's online store, a request to purchase the first item; cause the first item purchased by the first visitor to be shipped to the first visitor; receive, from the first visitor, an indication that the first visitor wishes to return the first item purchased via the first retailer's online store to an offline store of a second retailer of the plurality of retailers different from the first retailer; receive, from the second retailer, an indication that the first item has been returned to the second retailer's offline store; update, in the item database, an inventory location associated with the first item to the second retailer's offline store despite the second retailer not having had any prior transaction or agreement with the first retailer with respect to the first item; retrieve the return option associated with the first item, wherein the return option is specified by the first retailer; determine whether the return option associated with the first retailer indicates that the first item can be re-sold by one of the plurality of retailers within the communication network other than the first retailer; in response to determining that the return option indicates that the first item can be re-sold by one of the plurality of retailers within the communication network other than the first retailer, prompt the second retailer to indicate whether the second retailer wishes to re-sell the first item that has been returned to the second retailer's offline store; receive, from the second retailer, an indication that the second retailer wishes to sell the first item returned to the second retailer's offline store; and cause the first item returned to the second retailer's offline store to be available for sale via the second retailer's online store provided by the network provider.

EI 12: The system of EI 11, wherein the network provider is further configured to: receive, from a second visitor at the second retailer's online store, a request to purchase the first item returned to the second retailer's offline store; provide a digital transaction receipt to the second visitor, wherein the digital transaction receipt provides information about the second retailer along with information about the first item that belongs to the first retailer; cause the first item purchased by the second visitor to be shipped to the second visitor; and notify the first retailer and the second retailer that the first item returned to the second retailer's offline store has been sold to the second visitor via the second retailer's online store.

EI 13: The system of EI 11, wherein the network provider is further configured to: receive, from the second retailer, an indication that the first item returned to the second retailer's offline store has been sold to a second visitor at the second retailer's offline store; cause a physical transaction receipt to be provided to the second visitor, wherein the physical transaction receipt provides information about the second retailer along with information about the first item that belongs to the first retailer; and notify the first retailer that the first item returned to the second retailer's offline store has been sold to the second visitor via the second retailer's online store.

EI 14: The system of EI 11, wherein the network provider is further configured to: determine, based on the return option associated with the first item, that the first item is allowed to be returned to an offline store of a retailer that is within the communication network of the network provider; output, to a computing device associated with the first visitor, a list of one or more retailers of the plurality of retailers within the communication network for selection by the first visitor as a location at which the first item is to be returned, wherein the list includes at least the second retailer's offline store.

EI 15: The system of EI 11, wherein the network provider is further configured to: prior to a resale of the first item that has been returned to the second retailer's offline store, determine that a condition for shipping the first item to the first retailer has been satisfied; and cause the first item to be shipped to the first retailer without a resale of the first item by the second retailer.

EI 16: The system of EI 11, wherein the network provider is further configured to: prior to a resale of the first item that has been returned to the second retailer's offline store, determine that a condition for shipping the first item to a warehouse of the network provider has been satisfied; and cause the first item to be shipped to the warehouse of the network provider without a resale of the first item by the second retailer.

EI 17: The system of EI 11, wherein the return option indicates a time period after which the first item is to be shipped to the first retailer if not yet resold by the second retailer.

EI 18: The system of EI 11, wherein a resale price at which the first item is available for purchase on the second retailer's online store is different from an original selling price at which the first item was purchased by the first visitor.

EI 19: The system of EI 11, wherein the network provider is further configured to output, to a computing device associated with the first retailer, a user interface for specifying the return option associated with the first item, wherein the user interface is configured to receive the first retailer's input regarding one or more of (i) whether the first item is allowed to be returned to another retailer's offline store, (ii) whether the first item is allowed to be re-sold by another retailer, and (iii) a time limit after which the first item is to be shipped to the first retailer or another location designated by the first retailer without a resale of the first item.

EI 20: The system of EI 11, wherein the network provider is further configured to determine that a unique identifier of the first item has been scanned by a physical scanner provided at the second retailer's offline store, wherein the physical scanner is configured to scan at least one other item that is available for purchase at the second retailer's offline store but is not available for purchase on the second retailer's online store.

Other Considerations

Depending on the implementation, certain acts, events, or functions of any of the algorithms described herein can be performed in a different sequence, can be added, merged, or left out altogether (e.g., not all described acts or events are necessary for the practice of the algorithms). Moreover, in certain implementations, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Logical blocks, modules or units described in connection with implementations disclosed herein can be implemented or performed by a computing device having at least one processor, at least one memory, and at least one communication interface. The elements of a method, process, or algorithm described in connection with implementations disclosed herein can be embodied directly in hardware, in a software module executed by at least one processor, or in a combination of the two. Computer-executable instructions for implementing a method, process, or algorithm described in connection with implementations disclosed herein can be stored in a non-transitory computer readable storage medium.

Although the implementations of the inventions have been disclosed in the context of certain implementations and examples, it will be understood by those skilled in the art that the present inventions extend beyond the specifically disclosed implementations to other alternative implementations and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the implementations may be made and still fall within one or more of the inventions. Accordingly, it should be understood that various features and aspects of the disclosed implementations can be combined with or substituted for one another in order to form varying modes of the disclosed inventions. Thus, it is intended that the scope of the present inventions herein disclosed should not be limited by the particular disclosed implementations described above, and that various changes in form and details may be made without departing from the spirit and scope of the present disclosure as set forth in the following claims.

What is claimed is:

1. A method for facilitating management of network resources, the method comprising:

providing a database storing network resource information associated with a plurality of network resources registered with a network provider by a plurality of internal users within a communication network of the network provider, wherein the network provider is configured to provide, to each internal user of the plurality of internal users, a network portal accessible by other users of the network provider;

receiving, from a first internal user of the plurality of internal users, a request to make a first network resource available via the first internal user's network portal, wherein the request specifies (i) a sharing option according to which the first network resource is to be shared across the plurality of internal users, and (ii) a resource transfer option according to which a transfer of the first network resource is to be processed;

causing the first network resource to be available for acquisition via at least the first internal user's network portal;

receiving, from a first visitor at the first internal user's network portal, a request to acquire the first network resource;

causing the first network resource to be transferred to the first visitor;

receiving, from the first visitor, an indication that the first visitor wishes to transfer the first network resource acquired via the first internal user's network portal via a physical portal associated with a second internal user of the plurality of internal users different from the first internal user;

receiving, from the second internal user, an indication that the first network resource has been processed at the physical portal associated with the second internal user;

updating, in the network resource database, a physical location associated with the first network resource to the physical portal associated with the second internal user despite the second internal user not having had any prior history transacting with the first internal user with respect to the first network resource;

retrieving the resource transfer option associated with the first network resource, wherein the resource transfer option is specified by the first internal user;

determining whether the resource transfer option associated with the first internal user indicates that the first network resource can be transferred by the second internal user to a user other than the first internal user;

in response to determining that the resource transfer option indicates that the first network resource can be transferred by the second internal user to a user other than the first internal user, prompting the second internal user to indicate whether the second internal user wishes to transfer the first network resource that has been processed via the physical portal associated with the second internal user to a user other than the first internal user;

receiving, from the second internal user, an indication that the second internal user wishes to transfer the first network resource processed via the physical portal associated with the second internal user to a user other than the first internal user; and causing the first network resource processed via the physical portal associated with the second internal user to be available acquisition by a user other than the first internal user via the second internal user's network portal provided by the network provider.

2. The method of claim 1, further comprising:

receiving, from a second visitor at the second internal user's network portal, a request to acquire the first network resource previously processed via the physical portal associated with the second internal user;

providing a digital transaction notification to the second visitor, wherein the digital transaction notification provides information about the second internal user along with information about the first network resource that belongs to the first internal user;

causing the first network resource acquired by the second visitor to be transferred to the second visitor; and notifying the first internal user and the second internal user that the first network resource processed via the physical portal associated with the second internal user has been further transferred to the second visitor via the second internal user's network portal.

3. The method of claim 2, further comprising:

receiving, from the second internal user, an indication that the first network resource processed via the physical portal associated with the second internal user has been further transferred to another user via the physical portal associated with the second internal user;

causing a physical transaction notification to be provided to the second visitor, wherein the physical transaction notification provides information about the second internal user along with information about the first network resource that belongs to the first internal user; and notifying the first internal user that the first network resource processed via the physical portal associated with the second internal user has been further transferred to another user via the physical portal associated with the second internal user.

4. The method of claim 1, further comprising:

determining, based on the resource transfer option associated with the first network resource, that the first network resource is allowed to be transferred to a physical portal of an internal user that is within the communication network of the network provider; and outputting, to a computing device associated with the first visitor, a list of one or more internal users of the plurality of internal users within the communication network for selection by the first visitor as a physical location to which the first network resource is to be transferred, wherein the list includes at least the physical portal associated with the second internal user.

5. The method of claim 1, further comprising:

prior to a transfer of the first network resource that has been transferred to the second internal user's physical portal, determining that a condition for transferring the first network resource to the first internal user has been satisfied; and causing the first network resource to be transferred to the first internal user without allowing the second internal user to transfer the first network resource to a user other than the first internal user.

6. The method of claim 1, further comprising:

prior to a transfer of the first network resource that has been transferred to the second internal user's physical portal, determining that a condition for transferring the first network resource to a physical portal associated with the network provider has been satisfied; and causing the first network resource to be transferred to the physical portal associated with the network provider without allowing the second internal user to transfer the first network resource to a user other than the first internal user.

7. The method of claim 1, wherein the resource transfer option indicates a time period after which the first network resource is to be transferred to the first internal user if not yet transferred by the second internal user to a user other than the first internal user.

8. The method of claim 1, wherein a resource cost at which the first network resource is to be transferred via the second internal user's network portal is different from a resource cost at which the first network resource was transferred to the first visitor.

9. The method of claim 1, further comprising outputting, to a computing device associated with the first internal user, a user interface for specifying the resource transfer option associated with the first network resource, wherein the user interface is configured to receive the first internal user's input regarding one or more of (i) whether the first network resource is allowed to be transferred to another internal user's physical portal, (ii) whether the first network resource is allowed to be subsequently transferred by another internal user, and (iii) a time limit after which the first network resource is to be transferred to the first internal user or another physical location designated by the first internal user without being further transferred to a user other than the first internal user.

10. The method of claim 1, further comprising determining that a unique identifier of the first network resource has been scanned by a physical scanner provided at the second internal user's physical portal, wherein the physical scanner is configured to scan at least one other network resource that is available for acquisition at the second internal user's physical portal but is not available for purchase on the second internal user's network portal.

11. A system for facilitating management of network resources, the system comprising:

a network provider comprising one or more computing devices;

a database storing network resource information associated with a plurality of network resources registered with the network provider by a plurality of internal users within a communication network of the network provider; and a plurality of network portals provided by the network provider, wherein the plurality of network portals are each associated with a respective internal user of the plurality of internal users and accessible by other users of the network provider, wherein the network provider is configured to:

receive, from a first internal user of the plurality of internal users, a request to make a first network resource available via the first internal user's network portal, wherein the request specifies (i) a sharing option according to which the first network resource is to be shared across the plurality of internal users, and (ii) a resource transfer option according to which a transfer of the first network resource is to be processed, cause the first network resource to be available for acquisition via at least the first internal user's network portal;

receive, from a first visitor at the first internal user's network portal, a request to acquire the first network resource;

cause the first network resource to be transferred to the first visitor;

receive, from the first visitor, an indication that the first visitor wishes to transfer the first network resource acquired via the first internal user's network portal via a physical portal associated with a second internal user of the plurality of internal users different from the first internal user;

receive, from the second internal user, an indication that the first network resource has been processed at the physical portal associated with the second internal user;

update, in the network resource database, a physical location associated with the first network resource to the physical portal associated with the second internal user despite the second internal user not having had any prior history transacting with the first internal user with respect to the first network resource;

retrieve the resource transfer option associated with the first network resource, wherein the resource transfer option is specified by the first internal user;

determine whether the resource transfer option associated with the first internal user indicates that the first network resource can be transferred by the second internal user to a user other than the first internal user;

in response to determining that the resource transfer option indicates that the first network resource can be transferred by the second internal user to a user other than the first internal user, prompt the second internal user to indicate whether the second internal user wishes to transfer the first network resource that has been processed via the physical portal associated with the second internal user to a user other than the first internal user;

receive, from the second internal user, an indication that the second internal user wishes to transfer the first network resource processed via the physical portal associated with the second internal user to a user other than the first internal user; and cause the first network resource processed via the physical portal associated with the second internal user to be available acquisition by a user other than the first internal user via the second internal user's network portal provided by the network provider.

12. The system of claim 11, wherein the network provider is further configured to:

receive, from a second visitor at the second internal user's network portal, a request to acquire the first network resource previously processed via the physical portal associated with the second internal user;

provide a digital transaction notification to the second visitor, wherein the digital transaction notification provides information about the second internal user along with information about the first network resource that belongs to the first internal user;

cause the first network resource acquired by the second visitor to be transferred to the second visitor; and notify the first internal user and the second internal user that the first network resource processed via the physical portal associated with the second internal user has been further transferred to the second visitor via the second internal user's network portal.

13. The system of claim 12, wherein the network provider is further configured to:

receive, from the second internal user, an indication that the first network resource processed via the physical portal associated with the second internal user has been further transferred to another user via the physical portal associated with the second internal user;

cause a physical transaction notification to be provided to the second visitor, wherein the physical transaction notification provides information about the second internal user along with information about the first network resource that belongs to the first internal user; and notify the first internal user that the first network resource processed via the physical portal associated with the second internal user has been further transferred to another user via the physical portal associated with the second internal user.

14. The system of claim 11, wherein the network provider is further configured to:

determine, based on the resource transfer option associated with the first network resource, that the first network resource is allowed to be transferred to a physical portal of an internal user that is within the communication network of the network provider; and output, to a computing device associated with the first visitor, a list of one or more internal users of the plurality of internal users within the communication network for selection by the first visitor as a physical location to which the first network resource is to be transferred, wherein the list includes at least the physical portal associated with the second internal user.

15. The system of claim 11, wherein the network provider is further configured to:

prior to a transfer of the first network resource that has been transferred to the second internal user's physical portal, determine that a condition for transferring the first network resource to the first internal user has been satisfied; and cause the first network resource to be transferred to the first internal user without allowing the second internal user to transfer the first network resource to a user other than the first internal user.

16. The system of claim 11, wherein the network provider is further configured to:

prior to a transfer of the first network resource that has been transferred to the second internal user's physical portal, determine that a condition for transferring the first network resource to a physical portal associated with the network provider has been satisfied; and cause the first network resource to be transferred to the physical portal associated with the network provider without allowing the second internal user to transfer the first network resource to a user other than the first internal user.

17. The system of claim 11, wherein the resource transfer option indicates a time period after which the first network resource is to be transferred to the first internal user if not yet transferred by the second internal user to a user other than the first internal user.

18. The system of claim 11, wherein a resource cost at which the first network resource is to be transferred via the second internal user's network portal is different from a resource cost at which the first network resource was transferred to the first visitor.

19. The system of claim 11, wherein the network provider is further configured to output, to a computing device associated with the first internal user, a user interface for specifying the resource transfer option associated with the first network resource, wherein the user interface is configured to receive the first internal user's input regarding one or more of (i) whether the first network resource is allowed to be transferred to another internal user's physical portal, (ii) whether the first network resource is allowed to be subsequently transferred by another internal user, and (iii) a time limit after which the first network resource is to be transferred to the first internal user or another physical location designated by the first internal user without being further transferred to a user other than the first internal user.

20. The system of claim 11, wherein the network provider is further configured to determine that a unique identifier of the first network resource has been scanned by a physical scanner provided at the second internal user's physical portal, wherein the physical scanner is configured to scan at least one other network resource that is available for acquisition at the second internal user's physical portal but is not available for purchase on the second internal user's network portal.

* * * * *